US012356141B2

(12) United States Patent
Liang et al.

(10) Patent No.: US 12,356,141 B2
(45) Date of Patent: Jul. 8, 2025

(54) AIR-PULSE GENERATING DEVICE, WEARABLE SOUND DEVICE, BLADELESS FAN, AND AIRFLOW PRODUCING METHOD

(71) Applicant: xMEMS Labs, Inc., Santa Clara, CA (US)

(72) Inventors: Jemm Yue Liang, Sunnyvale, CA (US); JengYaw Jiang, Saratoga, CA (US)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 18/624,105

(22) Filed: Apr. 1, 2024

(65) Prior Publication Data

US 2024/0251199 A1 Jul. 25, 2024

Related U.S. Application Data

(63) Continuation-in-part of application No. 18/321,753, filed on May 22, 2023, which is a continuation-in-part of application No. 17/553,806, filed on Dec. 17, 2021, now Pat. No. 11,758,335.

(60) Provisional application No. 63/459,170, filed on Apr. 13, 2023, provisional application No. 63/458,897, filed on Apr. 12, 2023, provisional application No. 63/447,835, filed on Feb. 23, 2023, provisional application No. 63/447,758, filed on Feb. 23, 2023, provisional application No. 63/436,103, filed on Dec. 29, 2022, provisional application No. 63/435,275, filed on Dec. 25, 2022, provisional application No.

(Continued)

(51) Int. Cl.

| | |
|---|---|
| ***H04R 1/28*** | (2006.01) |
| ***F04B 45/04*** | (2006.01) |
| ***H04R 1/42*** | (2006.01) |

(52) U.S. Cl.

CPC ........... *H04R 1/2823* (2013.01); *F04B 45/04* (2013.01); *H04R 1/42* (2013.01); *H04R 2460/11* (2013.01)

(58) Field of Classification Search

None

See application file for complete search history.

(56) References Cited

U.S. PATENT DOCUMENTS

| | | | |
|---|---|---|---|
| 4,275,363 | A | 6/1981 | Mishiro |
| 4,646,733 | A | 3/1987 | Stroh |

(Continued)

FOREIGN PATENT DOCUMENTS

| | | | |
|---|---|---|---|
| CN | 101282590 | A | 10/2008 |
| CN | 106454666 | A | 2/2017 |

(Continued)

OTHER PUBLICATIONS

Liang, the specification, including the claims, and drawings in the U.S. Appl. No. 17/553,808, filed Dec. 17, 2021.

(Continued)

*Primary Examiner* — Walter F Briney, III

(74) *Attorney, Agent, or Firm* — Winston Hsu

(57) ABSTRACT

An air-pulse generating device, a wearable sound device, bladeless fan, and an airflow producing method are disclosed. The air-pulse generating device includes a film structure, configured to be actuated to generate a plurality of air pulses at an ultrasonic pulse rate. The plurality of air pulses produces a net airflow toward one single direction.

29 Claims, 25 Drawing Sheets

Related U.S. Application Data

63/434,474, filed on Dec. 22, 2022, provisional application No. 63/433,740, filed on Dec. 19, 2022, provisional application No. 63/428,085, filed on Nov. 27, 2022, provisional application No. 63/354,433, filed on Jun. 22, 2022, provisional application No. 63/353,610, filed on Jun. 19, 2022, provisional application No. 63/353,588, filed on Jun. 18, 2022, provisional application No. 63/347,013, filed on May 30, 2022, provisional application No. 63/346,848, filed on May 28, 2022, provisional application No. 63/171,281, filed on Apr. 6, 2021, provisional application No. 63/143,510, filed on Jan. 29, 2021, provisional application No. 63/142,627, filed on Jan. 28, 2021, provisional application No. 63/139,188, filed on Jan. 19, 2021, provisional application No. 63/138,449, filed on Jan. 17, 2021, provisional application No. 63/137,479, filed on Jan. 14, 2021.

(56) References Cited

U.S. PATENT DOCUMENTS

| | | | | |
|---|---|---|---|---|
| 4,942,939 | A | 7/1990 | Harrison | |
| 4,973,876 | A | 11/1990 | Roberts | |
| 5,109,948 | A | 5/1992 | Sandstrom | |
| 5,611,406 | A | 3/1997 | Matsuzaki | |
| 7,736,324 | B1 | 6/2010 | Helgeson | |
| 10,425,732 | B1 | 9/2019 | Liang | |
| 10,484,784 | B1 | 11/2019 | Liang | |
| 10,771,893 | B1 | 9/2020 | Liang | |
| 10,779,088 | B1 | 9/2020 | Liang | |
| 11,172,310 | B2 | 11/2021 | Liang | |
| 12,028,673 | B2 | 7/2024 | Lo | |
| 2004/0024455 | A1 | 2/2004 | de Vries | |
| 2005/0235988 | A1 | 10/2005 | Hansen | |
| 2008/0121220 | A1 | 5/2008 | Wilder | |
| 2010/0246864 | A1* | 9/2010 | Hildebrandt | H04R 3/04 381/310 |
| 2010/0278368 | A1 | 11/2010 | Martin | |
| 2012/0018244 | A1 | 1/2012 | Robert | |
| 2012/0032892 | A1 | 2/2012 | Pasquero | |
| 2012/0081337 | A1 | 4/2012 | Camp, Jr. | |
| 2013/0044904 | A1 | 2/2013 | Margalit | |
| 2013/0279738 | A1 | 10/2013 | Daley | |
| 2014/0064036 | A1 | 3/2014 | Tseng | |
| 2014/0084396 | A1 | 3/2014 | Jenkins | |
| 2014/0341394 | A1 | 11/2014 | Croft, III | |
| 2016/0059206 | A1 | 3/2016 | Chen | |
| 2016/0261941 | A1 | 9/2016 | Brioschi | |
| 2016/0356876 | A1 | 12/2016 | Lazik | |
| 2016/0366521 | A1 | 12/2016 | Pinkerton, III | |
| 2016/0381464 | A1 | 12/2016 | Elyada | |
| 2017/0041708 | A1 | 2/2017 | Barzen | |
| 2017/0064450 | A1 | 3/2017 | Kursula | |
| 2017/0064457 | A1 | 3/2017 | Kupershmidt | |
| 2017/0201192 | A1* | 7/2017 | Tumpold | H04R 7/06 |
| 2017/0230756 | A1 | 8/2017 | Schelling | |
| 2017/0255007 | A1 | 9/2017 | Inoue | |
| 2018/0179048 | A1 | 6/2018 | Schenk | |
| 2019/0020944 | A1 | 1/2019 | Kubo | |
| 2019/0116417 | A1 | 4/2019 | Liang | |
| 2019/0141435 | A1 | 5/2019 | Lo | |
| 2019/0238974 | A1 | 8/2019 | Hong | |
| 2019/0313189 | A1 | 10/2019 | Liang | |
| 2020/0059719 | A1 | 2/2020 | Liang | |
| 2020/0068281 | A1 | 2/2020 | Chu | |
| 2020/0087138 | A1 | 3/2020 | Schenk | |
| 2020/0100033 | A1* | 3/2020 | Stoppel | H04R 31/003 |
| 2020/0211521 | A1 | 7/2020 | Voss | |
| 2020/0213770 | A1 | 7/2020 | Duan | |
| 2021/0113029 | A1* | 4/2021 | Wu | A47J 39/003 |
| 2021/0144884 | A1* | 5/2021 | Mou | H10N 30/875 |
| 2021/0377652 | A1 | 12/2021 | Unruh | |
| 2022/0047841 | A1 | 2/2022 | Duran Vargas | |
| 2022/0224999 | A1 | 7/2022 | Liang | |
| 2022/0225032 | A1 | 7/2022 | Liang | |
| 2023/0388695 | A1 | 11/2023 | Lo | |

FOREIGN PATENT DOCUMENTS

| | | | |
|---|---|---|---|
| CN | 106961651 | A | 7/2017 |
| CN | 110839195 | A | 2/2020 |
| CN | 111083603 | A | 4/2020 |
| CN | 111083615 | A | 4/2020 |
| CN | 108496345 | B | 2/2021 |
| CN | 114390410 | A | 4/2022 |
| EP | 3 860 145 | A1 | 8/2021 |
| EP | 4 030 782 | A1 | 7/2022 |
| EP | 4 283 607 | A1 | 11/2023 |
| JP | 11-313387 | A | 11/1999 |
| JP | 2008-67046 | A | 3/2008 |
| JP | 2011-160309 | A | 8/2011 |
| JP | 2020-508606 | A | 3/2020 |
| JP | 2020-522178 | A | 7/2020 |
| JP | 2022-16392 | A | 1/2022 |
| JP | 2022-160366 | A | 10/2022 |
| JP | 2022-160367 | A | 10/2022 |
| JP | 2022-160368 | A | 10/2022 |
| KR | 10-2007-0083047 | A | 8/2007 |
| KR | 10-1901204 | B1 | 9/2018 |
| KR | 10-2019-0043489 | A | 4/2019 |
| KR | 10-2019-0116898 | A | 10/2019 |
| KR | 10-2093804 | B1 | 3/2020 |
| KR | 10-2022-0103042 | A | 7/2022 |
| TW | 201902812 | A | 1/2019 |
| WO | 2016/202790 | A2 | 12/2016 |
| WO | 2020/230484 | A1 | 11/2020 |

OTHER PUBLICATIONS

Liang, the specification, including the claims, and drawings in the U.S. Appl. No. 17/553,813, filed Dec. 17, 2021.

TutorialsPoint, "Analog Communication—DSBSC Modulation", captured by web.archive.org on Nov. 26, 2020, retrieved on Dec. 11, 2023 from the Internet URL: https://web.archive.org/web/20201126095635/https://www.tutorialspoint.com/analog_communication/analog_communication_dsbsc_modulation.htm.

Zhang Hui et al., Design and Test of Air-Coupled Capacitive Micromachined Ultrasonic Transducer Array, Chinese Journal of Sensors and Actuators, www.chinatransducers.com, vol. 31, No. 5, p. 803-808, May 2018 ,May 31, 2018.

* cited by examiner

AIR-PULSE GENERATING DEVICE, WEARABLE SOUND DEVICE, BLADELESS FAN, AND AIRFLOW PRODUCING METHOD

CROSS REFERENCE TO RELATED APPLICATIONS

This application is a continuation-in-part of U.S. application Ser. No. 18/321,753, filed on May 22, 2023, which is a continuation-in-part of U.S. application Ser. No. 17/553,806, filed on Dec. 17, 2021, which claims the benefit of U.S. Provisional Application No. 63/137,479, filed on Jan. 14, 2021, and claims the benefit of U.S. Provisional Application No. 63/138,449, filed on Jan. 17, 2021, and claims the benefit of U.S. Provisional Application No. 63/139,188, filed on Jan. 19, 2021, and claims the benefit of U.S. Provisional Application No. 63/142,627, filed on Jan. 28, 2021, and claims the benefit of U.S. Provisional Application No. 63/143,510, filed on Jan. 29, 2021, and claims the benefit of U.S. Provisional Application No. 63/171,281, filed on Apr. 6, 2021. Besides, U.S. application Ser. No. 18/321,753 claims the benefit of U.S. Provisional Application No. 63/346,848, filed on May 28, 2022, and claims the benefit of U.S. Provisional Application No. 63/347,013, filed on May 30, 2022, and claims the benefit of U.S. Provisional Application No. 63/353,588, filed on Jun. 18, 2022, and claims the benefit of U.S. Provisional Application No. 63/353,610, filed on Jun. 19, 2022, and claims the benefit of U.S. Provisional Application No. 63/354,433, filed on Jun. 22, 2022, and claims the benefit of U.S. Provisional Application No. 63/428,085, filed on Nov. 27, 2022, and claims the benefit of U.S. Provisional Application No. 63/433,740, filed on Dec. 1, 2022, and claims the benefit of U.S. Provisional Application No. 63/434,474, filed on Dec. 22, 2022, and claims the benefit of U.S. Provisional Application No. 63/435,275, filed on Dec. 25, 2022, and claims the benefit of U.S. Provisional Application No. 63/436,103, filed on Dec. 29, 2022, and claims the benefit of U.S. Provisional Application No. 63/447,758, filed on Feb. 23, 2023, and claims the benefit of U.S. Provisional Application No. 63/447,835, filed on Feb. 23, 2023, and claims the benefit of U.S. Provisional Application No. 63/459,170, filed on Apr. 13, 2023. Further, this application claims the benefit of U.S. Provisional Application No. 63/458,897, filed on Apr. 12, 2023. The contents of these applications are incorporated herein by reference.

BACKGROUND OF THE INVENTION

1. Field of the Invention

The present invention relates to an air-pulse generating device, wearable sound device, and bladeless fan thereof, and more particularly, to an air-pulse generating device, wearable sound device, and bladeless fan thereof improving user experience.

2. Description of the Prior Art

As electronic devices (e.g., a smartphone or a tablet) slim down, they also demand increasingly more complicated computations and thus drains more battery power. Heat management is of escalating importance for the future viability of an (palm-sized) electronic device.

Besides, wearing headphones in moist ears may compromise the longevity of the headphones, or make it difficult to dry the ears. Therefore, ear canal drying may be desirable after water-related activities (e.g., swimming or surfing) or shower.

SUMMARY OF THE INVENTION

It is therefore a primary objective of the present application to provide an air-pulse generating device, a wearable sound device, and a bladeless fan thereof, to improve over disadvantages of the prior art.

An embodiment of the present application discloses an air-pulse generating device, comprising a film structure, configured to be actuated to generate a plurality of air pulses at an ultrasonic pulse rate; wherein the plurality of air pulses produce a net airflow toward one single direction.

An embodiment of the present application discloses a wearable sound device, comprising a housing; and an air-pulse generating device, configured to generate a plurality of air pulses to ventilate an ear canal.

An embodiment of the present application discloses a bladeless fan, wherein the bladeless fan produces a plurality of air pulses according to the air pressure variation, and the plurality of air pulses are asymmetric; wherein the plurality of air pulses produced by the bladeless fan constitute net air movement or net airflow toward one direction.

An embodiment of the present application discloses a method of producing airflow, comprising producing a plurality of asymmetric air pulse, by an air-pulse generating device, at an ultrasonic pulse rate; wherein the plurality of asymmetric air pulses produce a net airflow toward a single direction.

These and other objectives of the present invention will no doubt become obvious to those of ordinary skill in the art after reading the following detailed description of the preferred embodiment that is illustrated in the various figures and drawings.

DETAILED DESCRIPTION

A fundamental aspect of the present invention relates to an air-pulse generating device, and more particularly, to an air-pulse generating device comprising a modulating means and a demodulating means, where the said modulating means generates an ultrasonic air pressure wave/variation (UAW) having a frequency $f_{UC}$, where the amplitude of UAW is modulated according to an input audio signal $S_{IN}$, which is an electrical (analog or digital) representation of a sound signal SS. This amplitude modulated ultrasonic air pressure wave/variation (AMUAW) is then synchronously demodulated by the said demodulating means such that spectral components embedded in AMUAW is shifted by $\pm n \cdot f_{UC}$, where n is a positive integer. As a result of this synchronous demodulation, spectral components of AMUAW, corresponding to sound signal SS, is partially transferred to the baseband and audible sound signal SS is reproduced as a result. Herein, the amplitude-modulated ultrasonic air pressure wave/variation AMUAW may be corresponding to a carrier component with the ultrasonic carrier frequency $f_{UC}$ and a modulation component corresponding to the input audio signal $S_{IN}$.

Figure 1:
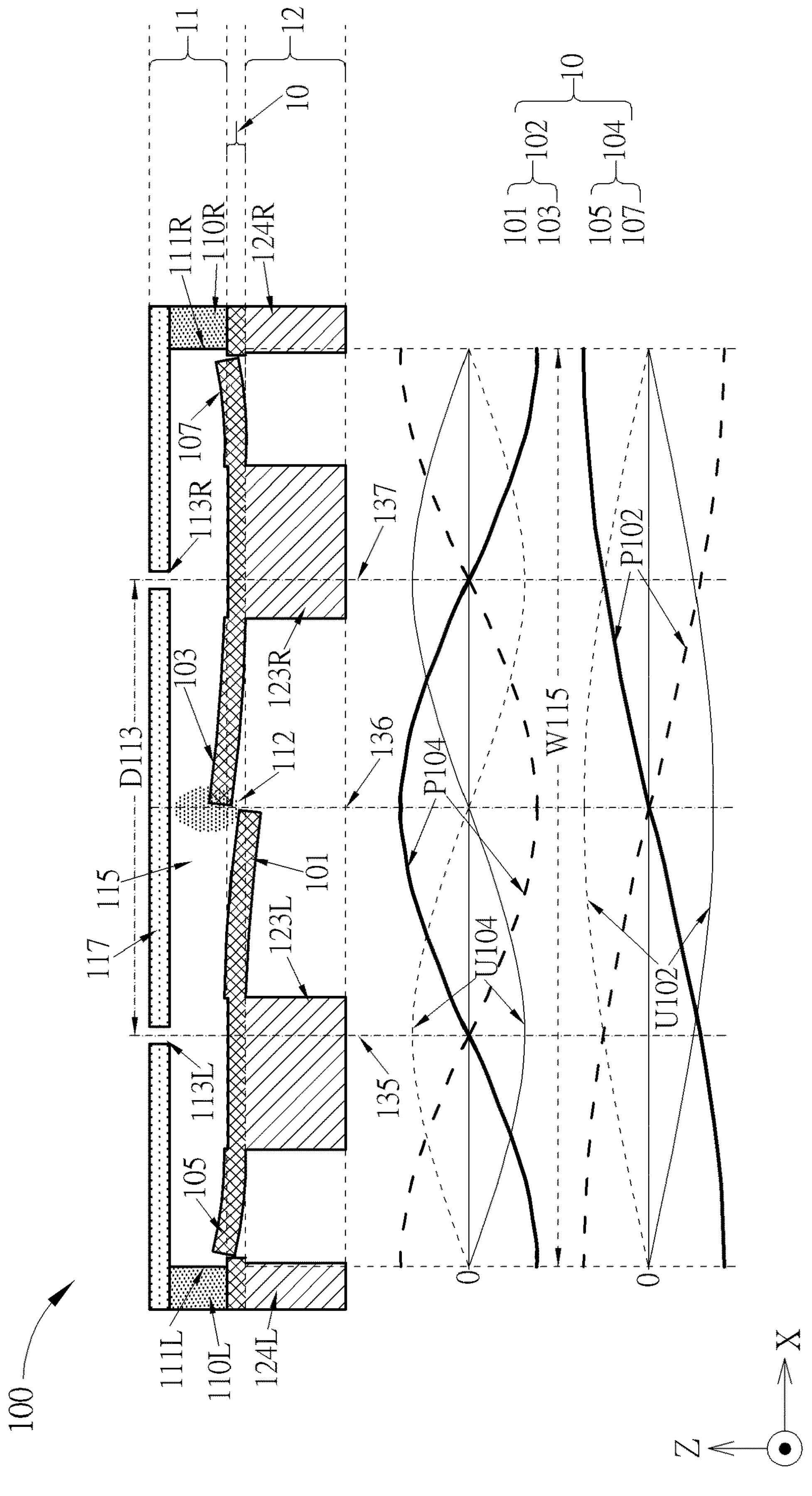
FIG. 1 is a schematic diagram of an air-pulse generating device according to an embodiment of the present invention.

FIG. 1 illustrates a schematic diagram of an air-pulse generating (APG) device 100 according to an embodiment of the present invention. The device 100 may be applied as a sound producing device which produces an acoustic sound according to an input (audio) signal $S_{IN}$, but not limited thereto.

The device 100 comprises a device layer 12 and a chamber definition layer 11. The device layer 12 comprises walls 124L, 124R and supporting structures 123R, 123L supporting a thin film layer which is etched to flaps 101, 103, 105, and 107. In an embodiment, the device layer 12 may be fabricated by MEMS (Micro Electro Mechanical Systems) fabrication process, for example, using a Si substrate of 250~500 μM in thickness, which will be etched to form 123L/R and 124R/L. In an embodiment, on top of this Si substrate, a thin layer, typically 3~6 μM in thickness, made of silicon on insulator SOI or POLY on insulator POI layer, will be etched to form flaps 101, 103, 105 and 107.

The chamber definition layer (which may be also viewed/named as "cap" structure) 11 comprises a pair of chamber sidewalls 110R, 110L and a chamber ceiling 117. In an embodiment, the chamber definition layer (or cap structure) 11 may be manufactured using MEMS fabrication technology. A resonance chamber 115 is defined between this chamber definition layer 11 and the device layer 12.

In other words, the device 100 may be viewed as comprising a film structure 10 and the cap structure 11, between which the chamber 115 is formed. The film structure 10 can be viewed as comprising a modulating portion 104 and a demodulating portion 102. The modulating portion 104, comprising the (modulating) flaps 105 and 107, is configured to be actuated to form an ultrasonic air/acoustic wave within the chamber 115, where air/acoustic wave can be viewed as a kind of air pressure variation, varying both temporally and spatially. In an embodiment, the ultrasonic air/acoustic wave or air pressure variation may be an amplitude DSB-SC (double-sideband suppress carrier) modulated air/acoustic wave with the ultrasonic carrier frequency $f_{UC}$. The ultrasonic carrier frequency $f_{UC}$ may be, for example, in the range of 160 KHz to 192 KHz, which is significantly larger than the maximum frequency of human audible sound.

The terms air wave and acoustic wave will be used interchangeably below.

The demodulating portion 102, comprising the (demodulating) flaps 101 and 103, is configured to operate synchronously with the modulating portion 104, shifting spectral components of DSB-SC modulated acoustic wave generated by the modulating portion 104 by $\pm n \times f_{UC}$, where n is positive integer, producing a plurality air pulses toward an ambient according to the ultrasonic air wave within the chamber 115, such that the baseband frequency component of the plurality air pulses (which is produced by the demodulating portion 102 according to the ultrasonic air wave within the chamber 115) would be or be corresponding/related to the input (audio) signal $S_{IN}$, where the low frequency component of the plurality air pulses may refer to frequency component of the plurality air pulses which is within an audible spectrum (e.g., below 20 or 30 KHz). Herein, baseband may usually be referred to audible spectrum, but not limited thereto.

In other words, when the device 100 is switched to sound producing application, the modulating portion 104 may be actuated to form the modulated air wave according to the input audio signal $S_{IN}$, and the demodulating portion 102, operate in synchronous with modulation portion 104, produces the plurality air pulses with low frequency component thereof as (or corresponding/related to) the input audio signal $S_{IN}$. For sound producing applications, where $f_{UC}$ is typically much higher than the highest human audible frequency, such as $f_{UC} \geq 96$ KHz 5×20 KHz, then through the natural/environmental low pass filtering effect (caused by physical environment such as walls, floors, ceilings, furniture, or the high propagation loss of ultrasound, etc., and human ear system such as ear canal, eardrum, malleus, incus, stapes, etc.) on the plurality air pulses, what the listener perceive will only be the audible sound or music represented by the input audio signal $S_{IN}$.

Figure 19:
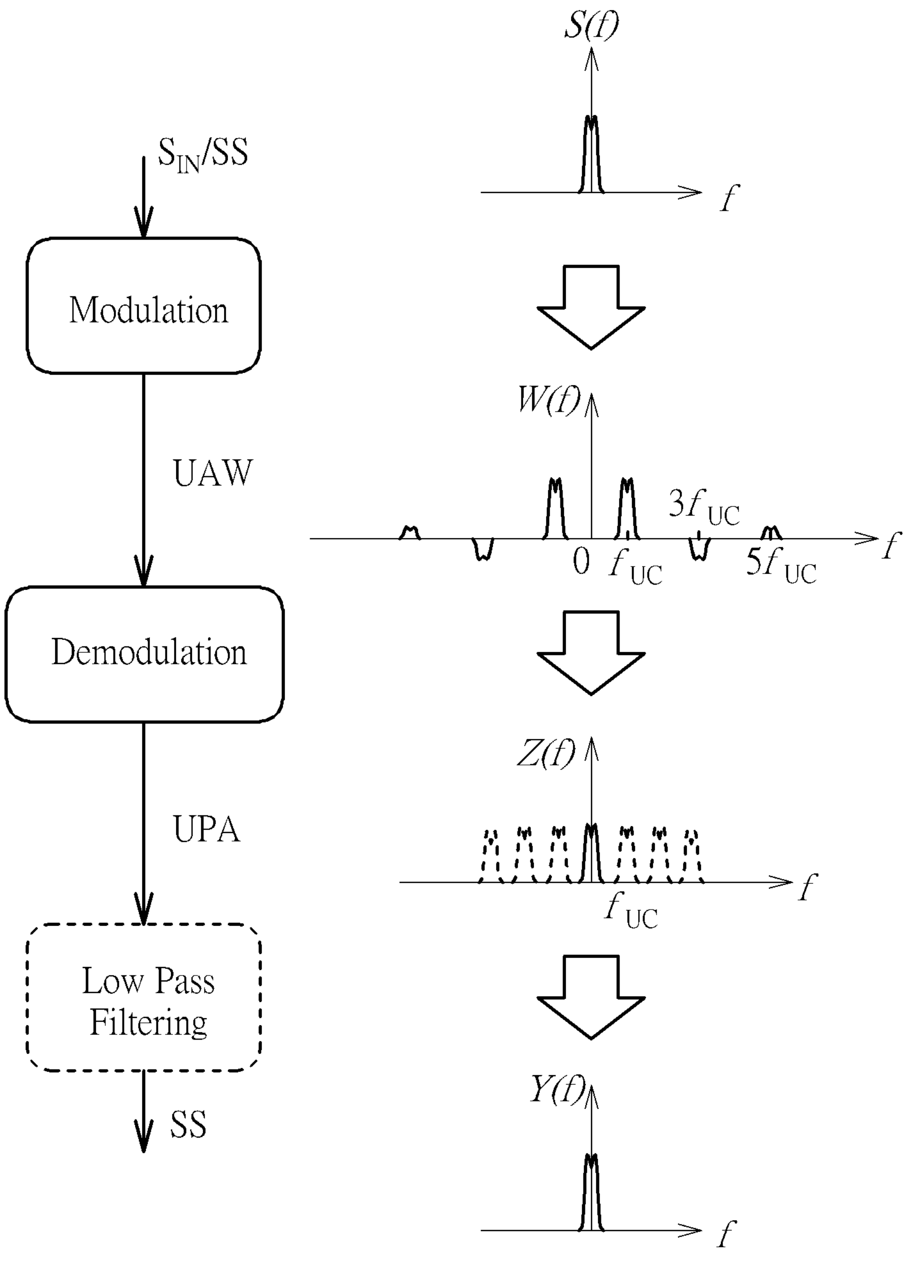
FIG. 19 illustrates a system perspective of the functions of each component and their corresponding frequency domain effects.

Illustratively, FIG. 19 conceptually/schematically demonstrates the effect of (de)modulation operation by showing frequency spectrums of signals before and after the (de) modulation operation. In FIG. 19, the modulation operation produces an amplitude modulated ultrasonic acoustic/air wave UAW with spectrum shown as W(f), according to the input audio signal $S_{IN}$, which is an electrical (analog or digital) representation of a sound signal SS. The spectrum of $S_{IN}$/SS is represented as S(f) in FIG. 19. The synchronous demodulation operation, producing an ultrasonic pulse array UPA (comprising the plurality of pulses) with spectrum illustrated as Z(f), can be viewed as (comprising step of) shifting spectral components of the ultrasonic acoustic/air wave UAW by $\pm n\times f_{UC}$ (with integer n) and spectral component of the ultrasonic air wave UAW corresponding to the sound signal SS is partially transferred to the baseband. Hence, as can be seen from Z(f), baseband component of the ultrasonic pulse array UPA is significant, compared to the amplitude modulated UAW W(f). The ultrasonic pulse array UPA propagates toward ambient. Through the inherent low pass filtering effect of natural/physical environment and human hearing system, a resulting spectrum Y(f) corresponding to the sound signal SS can be reproduced.

Note that, different from conventional DSB-SC amplitude modulation using sinusoidal carrier, W(f) has component at $\pm 3\times f_{UC}$, $\pm 5\times f_{UC}$ and higher order harmonic of $f_{UC}$ (not shown in FIG. 19). It is because that the carrier of the modulation of the present invention is not purely sinusoidal.

Referring back to FIG. 1, as an embodiment of the synchronous demodulation operation, the demodulating portion 102 may be actuated to form an opening 112 at the time and location which are corresponding/aligned to peak(s) of the modulated air wave. In other words, when the modulated air wave reaches its peak at the location of the opening 112, the demodulating portion 102 may be actuated such that the opening 112 also reaches its peak.

In the embodiment shown in FIG. 1, the demodulating portion 102 forms the opening 112 at a center location between the sidewalls 110L and 110R, which have a surface-to-surface, or 111L to 111R, spacing of (substantially) $\lambda_{UC}$ between them, meaning that tips of the flaps 101 and 103 are (substantially) $\lambda_{UC}/2$ away from the sidewalls 110L and 110R, or away from the sidewall surfaces 111L and 111R, where $\lambda_{UC}$ represent a wavelength corresponding to the ultrasonic carrier frequency $f_{UC}$, i.e., $\lambda_{UC}=C/f_{UC}$ with C being the speed of sound.

In an embodiment, the demodulating portion 102 may be actuated to form the opening 112 at a valve opening rate synchronous to/with the ultrasonic carrier frequency $f_{UC}$. In the present invention, the valve opening rate being synchronous to/with the ultrasonic carrier frequency $f_{UC}$ generally refers that the valve opening rate is the ultrasonic carrier frequency $f_{UC}$ times a rational number, i.e., $f_{UC}\times(N/M)$, where N and M represent integers. In an embodiment, the valve opening rate (of the opening 112) may be the ultrasonic carrier frequency $f_{UC}$. For example, the valve/opening 112 may open every operating cycle $T_{CY}$, where the operating cycle $T_{CY}$ is a reciprocal of the ultrasonic carrier frequency $f_{UC}$, i.e., $T_{CY}=1/f_{UC}$.

In the present invention, (de)modulating portion 102/104 is also used to denote the (de)modulating flap pair. Moreover, the demodulating portion (or flap pair) 102 forming the opening 112 may be considered as a virtual valve, which performs an open-and-close movement and forms the opening 112 (periodically) according to specific valve/demodulation driving signals.

In an embodiment, the modulating portion 104 may substantially produce a mode-2 (or 2nd order harmonic) resonance (or standing wave) within the resonance chamber 115, as pressure profile P104 and airflow profile U104 illustrated in FIG. 1. In this regard, the spacing between sidewall surfaces 111L and 111R substantially defines a full wavelength $\lambda_{UC}$ corresponding to the ultrasonic carrier frequency $f_{UC}$, i.e., $W115\approx\lambda_{UC}=C/f_{UC}$. Furthermore, in the embodiment shown in FIG. 1, a free end of the modulating flap 105/107 is disposed by the sidewall 110L/110R.

Please be aware that, inter-modulation (or cross-coupling) between the modulation of generating the modulated air wave and the demodulation of forming the opening 112 might occur, which would degrade resulting sound quality. In order to enhance sound quality, minimizing inter-modulation (or cross-coupling) is desirable. To achieve that (i.e., minimize the cross coupling between the modulation and the demodulation), the modulating flaps 105 and 107 are driven to have a common mode movement and the demodulating flaps 101 and 103 are driven to have a differential-mode movement. The modulating flaps 105 and 107 having the common mode movement means that the flaps 105 and 107 are simultaneously actuated/driven to move toward the same direction. The demodulating flaps 101 and 103 having the differential-mode movement means that the flaps 101 and 103 are simultaneously actuated to move toward opposite directions. Furthermore, in an embodiment, the flaps 101 and 103 may be actuated to move toward opposite directions with (substantially) the same displacement/magnitude.

The demodulating portion 102 may substantially produce a mode-1 (or 1st order harmonic) resonance (or standing wave) within the resonance chamber 115, as pressure profile P102 and airflow profile U102 formed by the demodulating portion 102 illustrated in FIG. 1. Hence, the demodulating portion 102 shall operate at a valve operating/driving frequency $f_{D\_V}$ (corresponding to valve/demodulation-driving signal) such that $W115\approx\lambda_{D\_V}/2$, where $\lambda_{D\_V}=C/f_{D\_V}$, and the valve operating/driving frequency shall be half of the ultrasonic carrier frequency $f_{UC}$, i.e., $f_{D\_V}=f_{UC}/2$.

Figure 2:
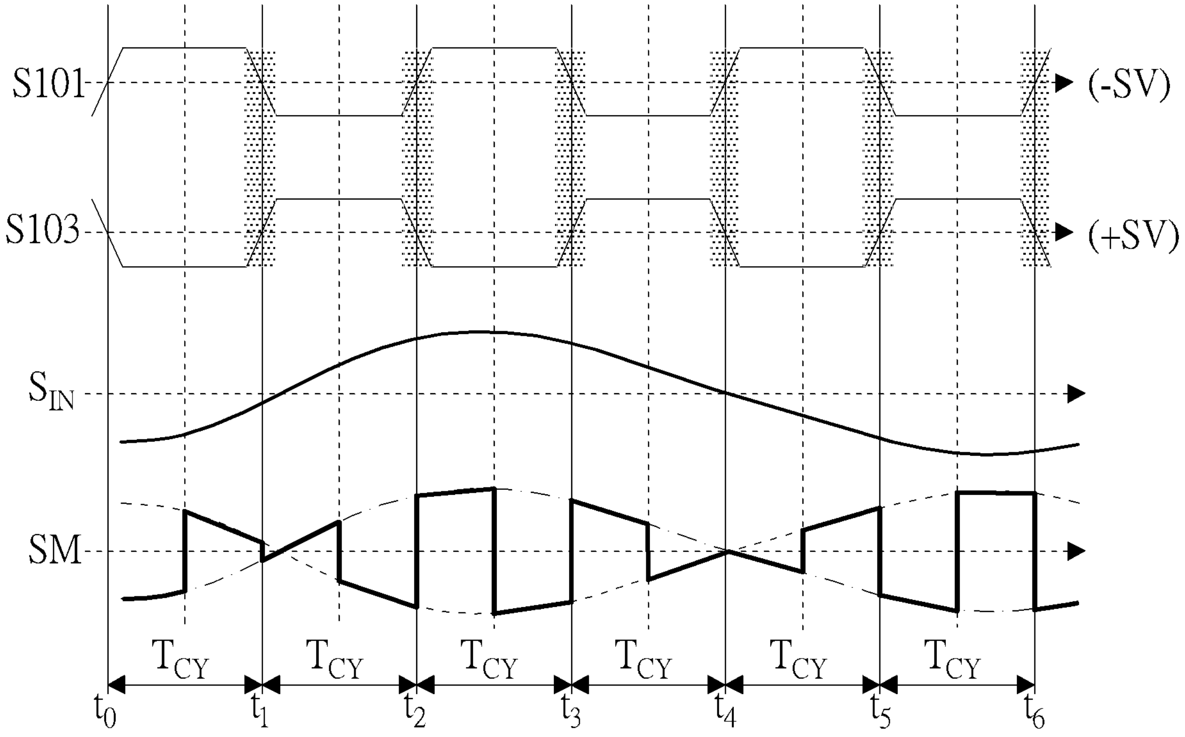
FIG. 2 illustrates waveforms of demodulation-driving signals and a modulation-driving signal according to an embodiment of the present invention.

The common mode movement and the differential mode movement can be driven by (de)modulation-driving signals. FIG. 2 illustrates waveforms of demodulation-driving signals S101, S103 and a modulation-driving signal SM. The modulation-driving signal SM is used to drive the modulating flaps 105 and 107. The demodulation-driving signals (or valve driving signals) S101 and S103 are used to drive the demodulating flaps 101 and 103, respectively.

In an embodiment, the modulation-driving signal SM can be viewed as pulse amplitude modulation (PAM) signal which is modulated according to the input audio signal $S_{IN}$. Furthermore, different from convention PAM signal, polarity (with respect to a constant voltage) of the signal SM toggles within one operating cycle $T_{CY}$. Generally, the modulation-driving signal SM comprises pulses with alternating polarities (with respect to the constant voltage) and with an envelope/amplitude of the pulses is (substantially) the same as or proportional/corresponding to an AC (alternative current) component of the input audio signal $S_{IN}$. In other words, the modulation-driving signal SM can be viewed as comprising a pulse amplitude modulation signal or comprising PAM-modulated pulses with alternating polarities with respect to the constant voltage. In the embodiment shown in FIG. 2, a toggling rate of the modulation-driving signal SM is $2\times f_{UC}$, which means that the polarity of the pulses within the modulation-driving signal SM alternates/toggles twice in one operating cycle $T_{CY}$.

The demodulation-driving signals S101 and S103 comprises two driving pulses of equal amplitude but with opposite polarities (with respect to a constant/average voltage). In other words, at a specific time, given S101 comprises a first pulse with a first polarity (with respect to the constant/average voltage) and S103 comprises a second pulse with a second polarity (with respect to the constant/ average voltage), the first polarity is opposite to the second polarity. As shown in FIG. 2, a toggling rate of the demodulation-driving signal S101/S103 is $f_{UC}$, which means that the polarities of the pulses within the demodulation-driving signal S101/S103 alternates/toggles once in one operating cycle $T_{CY}$. Hence, the toggling rate of the modulation-driving signal (SM) is twice of the toggling rate of the demodulation-driving signal S101/S103.

The slopes of S101/S103 (and the associated shaded area) are simplified drawing representing the energy recycling during the transitions between voltage levels. Note that, transition periods of the signals S101 and S103 overlap. Energy recycling may be realized by using characteristics of an LC oscillator, given the piezoelectric actuators of flap 101/103 are mostly capacitive loads. Details of the energy recycling concept may be referred to U.S. Pat. No. 11,057,692, which is incorporated herein by reference. Note that, piezoelectric actuator serves as an embodiment, but not limited thereto.

To emphasize the flap pair 102 is driven differentially, the signals S101 and S103 may also be denoted as −SV and +SV, signifying that this pair of driving signals have the same waveform but differ in polarity. For illustration purpose, −SV is for S101 and +SV is for S103, as shown in FIG. 2, but not limited thereto. In an embodiment, S101 may be +SV and S103 may be −SV.

In another embodiment, there may be a DC bias voltage $V_{BIAS}$ and $V_{BIAS} \neq 0$, under such situation driving signal S101=$V_{BIAS}$−SV, S103=$V_{BIAS}$+SV. Variations such as this shall be considered as within the scope of this disclosure.

In addition, FIG. 2 demonstrates difference in toggling rate between the modulation-driving signal SM and the demodulation-driving signal ±SV. Relative phase delay, meaning timing alignment, between the modulation-driving signal SM and the demodulation-driving signal ±SV may be adjusted according to practical requirement.

In an embodiment, driving circuit for generating the signals SM and ±SV may comprise a sub-circuit, which is configured to produce a (relative) delay between the modulation-driving signal SM and the demodulation-driving signal ±SV. Details of the sub-circuit producing the delay are not limited. Known technology can be incorporated in the sub-circuit. As long as the sub-circuit can generate the delay to fulfill the timing alignment requirements (which will be detailed later), requirements of the present invention is satisfied, which will be within the scope of the present invention.

Note that, the tips of the flaps 101 and 103 are at substantially the same location (the center location between the sidewalls 111L and 111R) and experience substantially the same air pressure at that location. In addition, the flaps 101 and 103 move differentially. Hence, movements of the tips of the flaps 101 and 103 owns a common mode rejection behavior, similar to the common mode rejection known in the field of analog differential OP-amplifier circuit, which means that the displacement difference of the tips of the demodulating flaps 101 and 103, or $|d_{101}-d_{103}|$, is barely impacted by air pressure formed by the modulating flaps 105 and 107.

Figure 3:
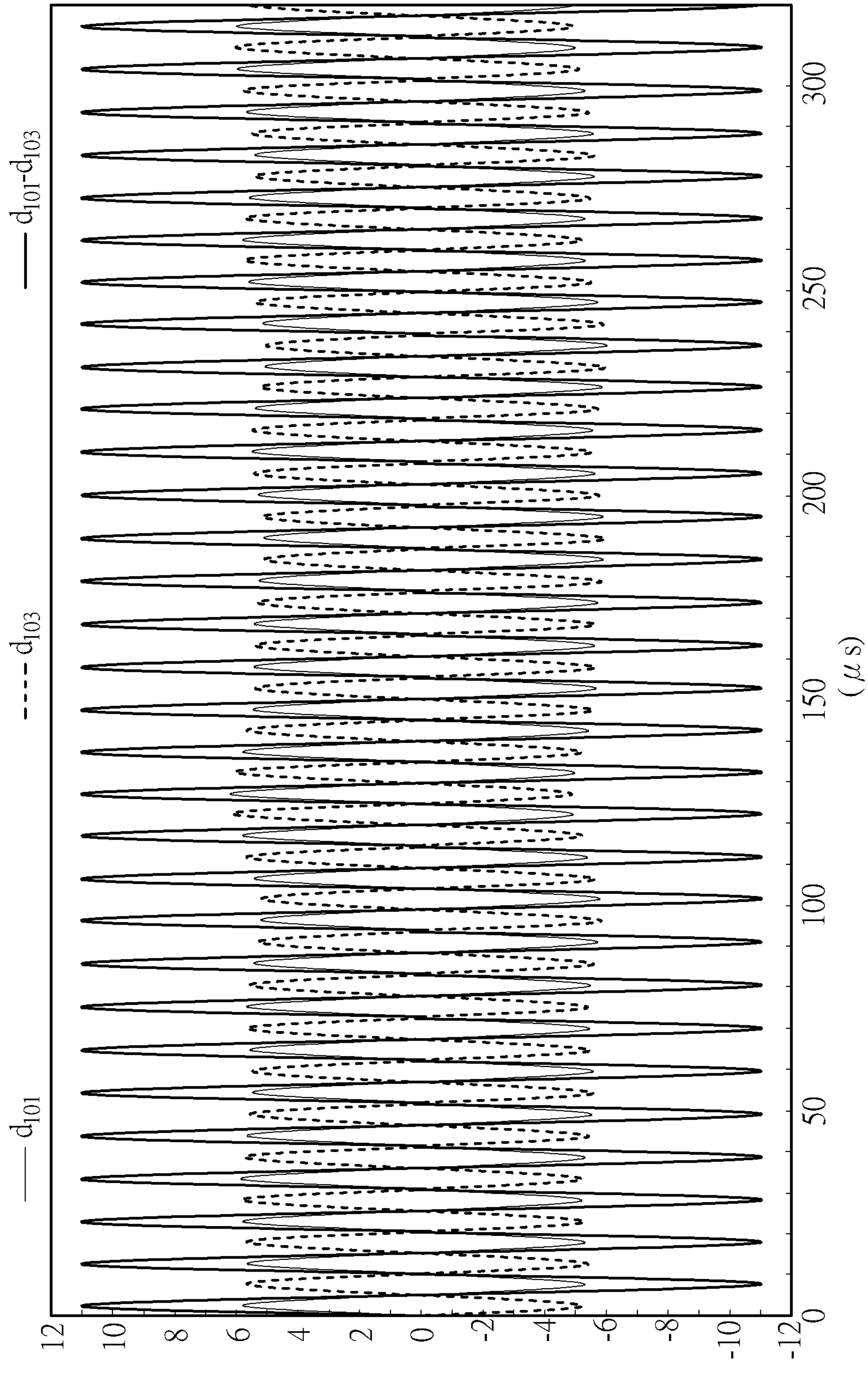
FIG. 3 illustrates simulated results corresponding to the device in FIG. 1.

The common mode rejection, or modulator-to-demodulator isolation, can be evidenced by FIG. 3. FIG. 3 illustrates simulated results generated from an equivalent circuit model of the device 100. Curves $d_{101}$ and $d_{103}$ represents movements/displacements of the tips of the flaps 101 and 103, respectively. As can be observed in FIG. 3, even though $d_{101}$ and $d_{103}$ fluctuates quite significantly due to the acoustic pressure generated by the modulating flap 105/107 (P104), the differential movement, represented by the curve denoted by $d_{101}-d_{103}$ in FIG. 3, remains (substantially) consistent. That is, width/gap of the valve opening 112 would be consistent even when the modulation portion 104 operates. In other words, modulator movement produces negligible impact on the functionality and performance of the demodulator, which is what "modulator-to-demodulator isolation" means.

On the other hand, as for demodulator-to-modulator isolation, since the flaps 101/103 produce $1^{st}$ order harmonic resonance or standing wave within the chamber 115, as can be seen from FIG. 1, pressure exerted by P102 on the flap 105 and the flap 107 would have substantially the same magnitude but of opposite polarity, causing the movements of the flap 105 and the flap 107 to experience changes (due to P102) that are also of the same magnitude but of opposite polarity. This will produce two ultrasonic waves (one by 105, the other by 107) that also changes same magnitude but of opposite polarity. When these two ultrasonic waves propagate to the location above the valve opening 112 (indicated by the dotted area shown in FIG. 1), they are merged into one pressure. Since the location of this "merge" occurs at the center of device 100, along X-axis or X direction, with equal distance from the tips of 105 and 107, the P102 induced changes would cancel/compensate each other and produce a net rest that is largely free from the interference of demodulator/virtual-valve operation.

Figure 4:
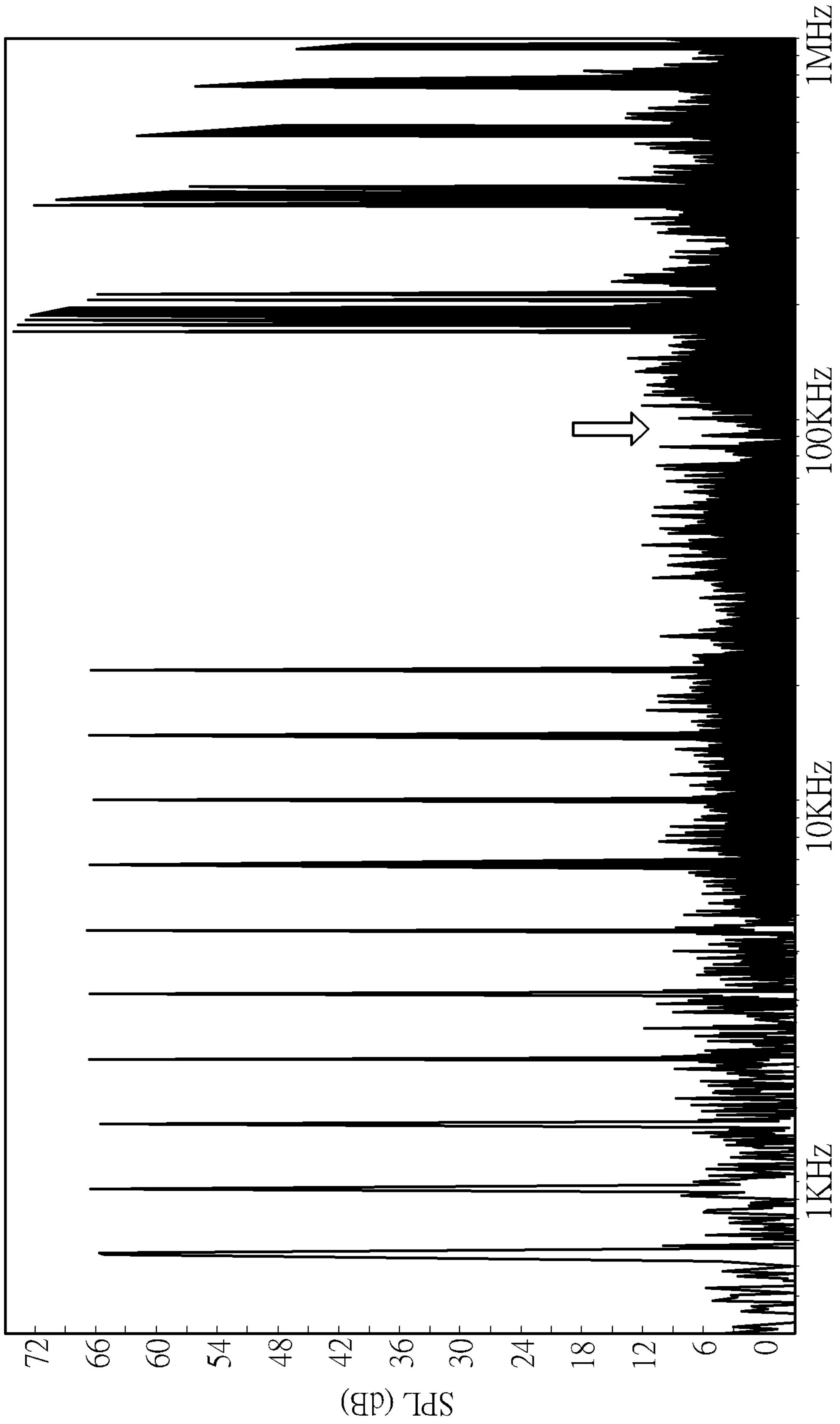
FIG. 4 plots a simulated frequency response of sound pressure level of the APG device in FIG. 1.

Illustratively, FIG. 4 plots a simulated frequency response of an SPL (sound pressure level), measured at 1 meter away from the device 100, under the condition that $S_{IN}$ is a 10-tone equal amplitude test signal (within 650~22K Hz and with equal log scale spacing) and an equivalent circuit simulation model of the device 100 is used. In the current simulation, the ultrasonic carrier frequency is set as $f_{UC}$=192 KHz and the valve operating frequency is set as $f_{D\_V}=f_{UC}/2$=96 KHz.

The demodulator-to-modulator isolation can be evidenced by the absence of extraneous spectral component at and around 96 KHz (pointed by block arrow in FIG. 4), indicating a high degree of isolation.

As a result, the interference of the movements of these two flap-pairs (101/103 versus 105/107) is minimized through the common mode (on modulator) versus differential-mode (on demodulator) orthogonality/arrangement.

In addition, the percentage of time valve remains open, or duty factor, is a critical factor affecting the output of device 100. Increasing amplitude of driving voltage S101 and S103 can increase the amplitude of the movements of the flaps 101 and 103, which will increase the maximum open width of the valve opening 112, and raising the driving voltage also raises the duty factor of valve opening. In other words, duty factor of the valve opening 112 and the maximum open width/gap of the valve opening 112 can be determined by the driving voltage S101 and S103.

Figure 5:
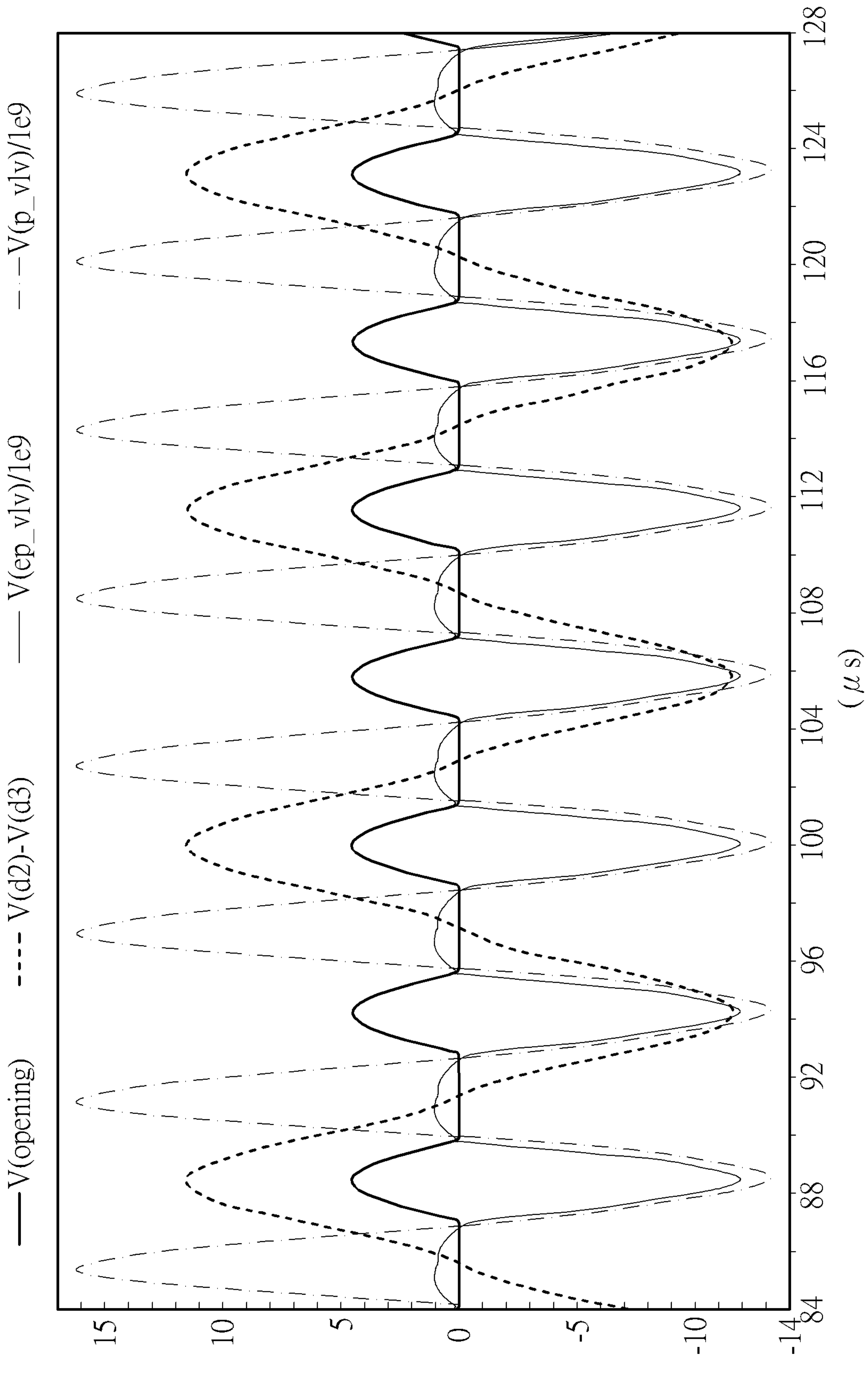
FIG. 5 illustrates simulated results corresponding to the device in FIG. 1.

When the opening duty factor of valve approaches 50%, such as the example shown in FIG. 5, which is generated from one of the equivalent circuit simulation models mentioned previously, the period of each valve opening, shown as curve labeled as V(opening)>0, overlaps with the same half-cycle of the amplitude modulated ultrasonic standing wave at the location atop the valve opening 112 (indicated by the dotted region in FIG. 1). By synchronizing and timing-aligning the opening-closing of valve opening 112 to the in-chamber standing wave, illustrated as curve labeled as V(p_vlv) in FIG. 5, a nicely shaped output pressure pulse, illustrated as curve labeled as V(ep_vlv), is produced.

Figure 6:
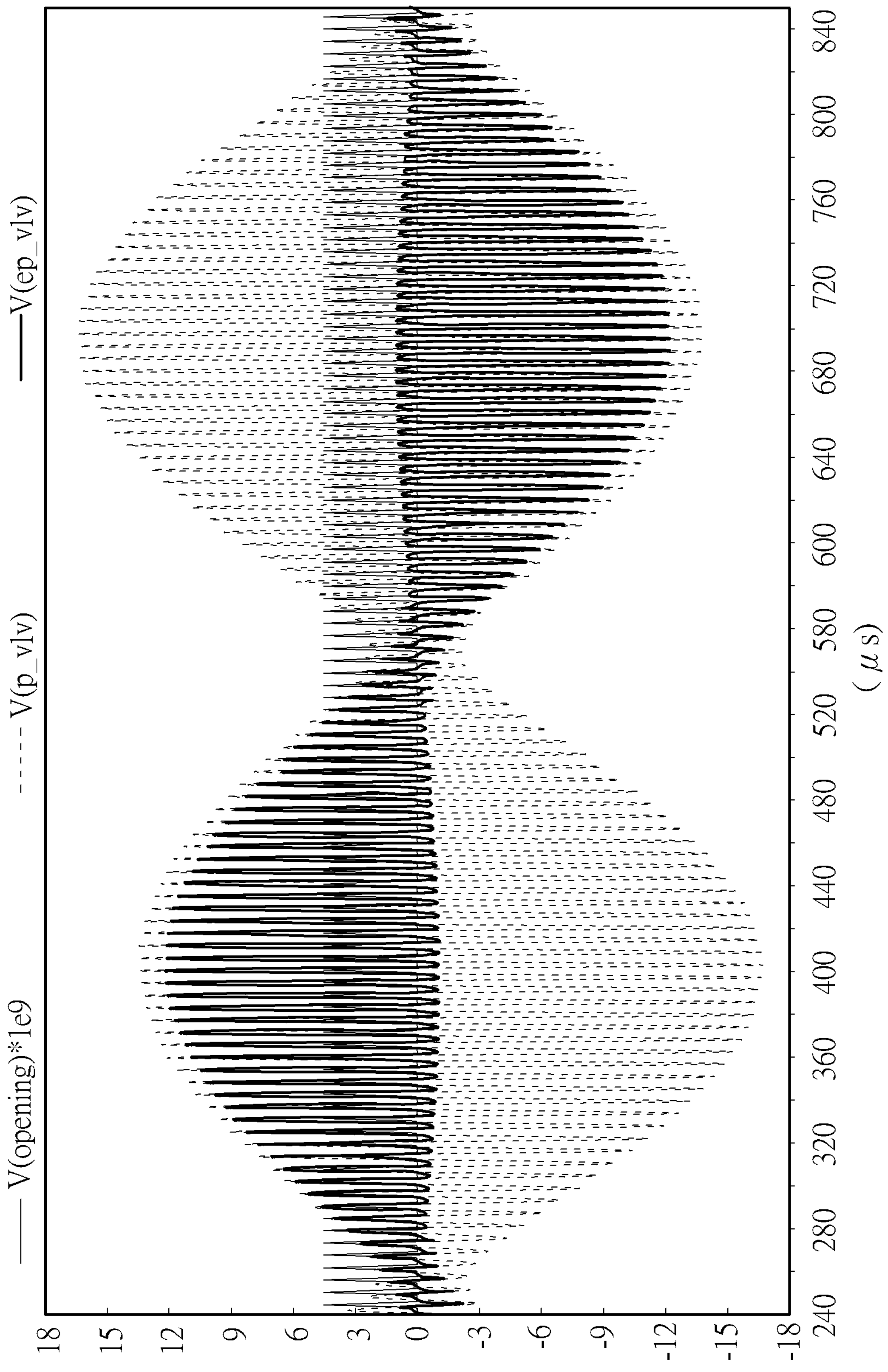
FIG. 6 illustrates simulated results corresponding to the device in FIG. 1.

In FIG. 5, curve labeled as V(d2)-V(d3) represent difference in displacement of flaps 101 and 103, i.e., $d_{101}$-$d_{103}$, curve labeled as V (opening) represent a degree of opening of the virtual valve 112. V (opening)>0 when |V(d2)-V(d3)|>TH, where TH is a threshold defined by parameters such as the thickness of the flaps 101 and 103, width of slit between flaps 101 and 103, boundary layer thickness, etc. V(ep_vlv) being nicely shaped may refer that pulses illustrated by V(ep_vlv) are highly asymmetric, unlike V(p_vlv) which is highly symmetric. Asymmetricity of output pressure pulses would demonstrate low frequency component (i.e., frequency component in audible band) of air pulses generated by the air pulse generating device, or APG device for brief, which is a desirable feature for the APG device. The higher the asymmetric is, the stronger the baseband frequency component of the air pulses will be. A zoomed-out view of FIG. 5 is illustrated in FIG. 6, showing the asymmetricity of V(ep_vlv) corresponding to the envelope of the baseband sound signal of 1.68 KHz. In the present invention, the opening (112) is opened/formed or in an opened status when difference in displacement of flaps 101 and 103 is larger than a threshold, e.g., |V(d2)-V(d3)|>TH, and is closed or in a closed status otherwise.

Furthermore, it is observed that the maximum output will occur when the duty factor of valve opening, defined as |V(d2)−V(d3)|>TH, is equal to or slightly larger than 50%, such as in the range of 55~60%, but not limited thereto. However, when the duty factor of valve opening is significantly higher than 50%, such as 80~85%, more than half-cycle of the in-chamber ultrasonic standing wave will pass through the valve, leading portions of the standing wave with different polarities to cancel each other out, resulting in lower net SPL output from device 100. It is therefore generally desirable to keep the duty factor of valve opening close to 50%, typically in the range between 50% and 70% (where the duty factor in the range between 45% and 70% is within the scope of present invention).

In addition to duty factor, to ensure the modulator-to-demodulator isolation, resonance frequency $f_{R\_V}$ of demodulating flaps 101/103 is suggested to be sufficiently deviated from the ultrasonic carrier frequency $f_{UC}$, which is another design factor.

It can be observed (from equivalent circuit simulation model) that, under the constraint of valve open duty factor equals 50%, for any given thickness of flaps 101/103, the higher is the resonance-to-diving ratio ($f_{R\_V}$:$f_{D\_V}$ or $f_{R\_V}/f_{D\_V}$), the wider the valve can open. Since the output of device 100 is positively related to the max width valve opens, it is therefore desirable to have the resonance-to-driving ratio higher than 1.

However, when $f_{R\_V}$ falls within the range of $f_{UC}$±max($f_{SOUND}$), flap 101/103 will start to resonate with the AM ultrasonic standing wave, converting portion of the ultrasound energy into common mode deformation of flap 101/103, where max($f_{SOUND}$) may represent maximum frequency of the input audio signal $S_{IN}$. Such common mode deformation of flaps 101/103 will cause the volume atop the flaps 101/103 to change, result in fluctuation of pressure inside chamber 115 at the vicinity of valve opening 112, over the affected frequency range, leading to depressed SPL output.

In order to avoid valve resonance induced frequency response fluctuations, it is preferable to design the flap 101/103 with a resonance frequency outside of the range of ($f_{UC}$±max($f_{SOUND}$))×M, where M is a safety margin for covering factors such as manufacturing tolerance, temperature, elevation, etc., but not limited thereto. As a rule of thumb, it is generally desirable to have $f_{R\_V}$ either significantly lower than $f_{UC}$ as in $f_{R\_V}\leq(f_{UC}-20\text{ KHz})\times0.9$ or significantly high than $f_{UC}$ as $f_{R\_V}\geq(f_{UC}+20\text{ KHz})\times1.1$. Note that 20 KHz is used here because it is well accepted as highest human audible frequency. In applications such as HD-/Hi-Res Audio, 30 KHz or even 40 KHz may be adopted as max($f_{SOUND}$), and the formula above should be modified accordingly.

In addition, suppose w(t) and z(t) represent functions of time for the amplitude-modulated ultrasonic acoustic/air wave UAW and the ultrasonic pulse array UPA (comprising the plurality of pulses). Since the opening 112 is formed periodically in the opening rate of the ultrasonic carrier frequency $f_{UC}$, a ratio function of z(t) to w(t), denoted as r(t) and can be expressed as r(t)=z(t)/w(t), is periodic with the opening rate of the ultrasonic carrier frequency $f_{UC}$. In other words, z(t) may be viewed as a multiplication of w(t) and r(t) in time domain, i.e., z(t)=r(t)·w(t), and the synchronous demodulation operation performed on UAW can be viewed as the multiplication on w(t) by r(t) in time domain. It implies that Z(f) may be viewed as a convolution of W(f) and R(f) in frequency domain, i.e., Z(f)=R(f)*W(f) where * denotes convolution operator, and the synchronous demodulation operation performed on UAW can be viewed as the convolution of W(f) with R(f) in frequency domain. Note that, when r(t) is periodic in time domain with the rate of the frequency $f_{UC}$, R(f) is discrete in frequency domain where frequency/spectrum components of R(f) are equally spaced by $f_{UC}$. Hence, the convolution of W(f) with R(f), or the synchronous demodulation operation, involves/comprises step of shifting W(f) (or the spectral components of UAW) by ±n×$f_{UC}$ (with integer n). Herein, r(t)/w(t)/z(t) and R(f)/W(f)/Z(f) form Fourier transform pair.

Figure 7:
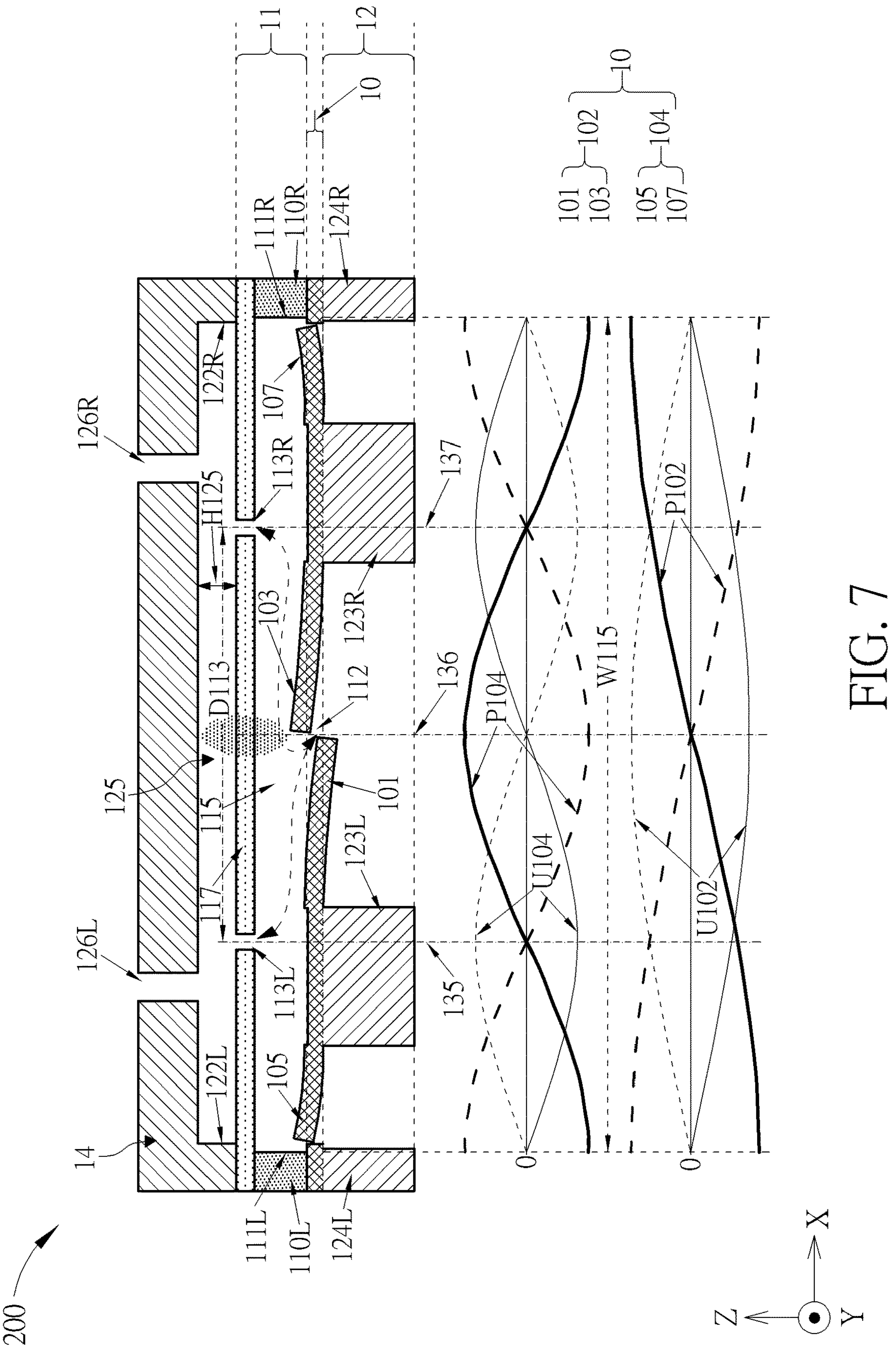
FIG. 7 is a schematic diagram of an air-pulse generating device according to an embodiment of the present invention.
Figure 8:
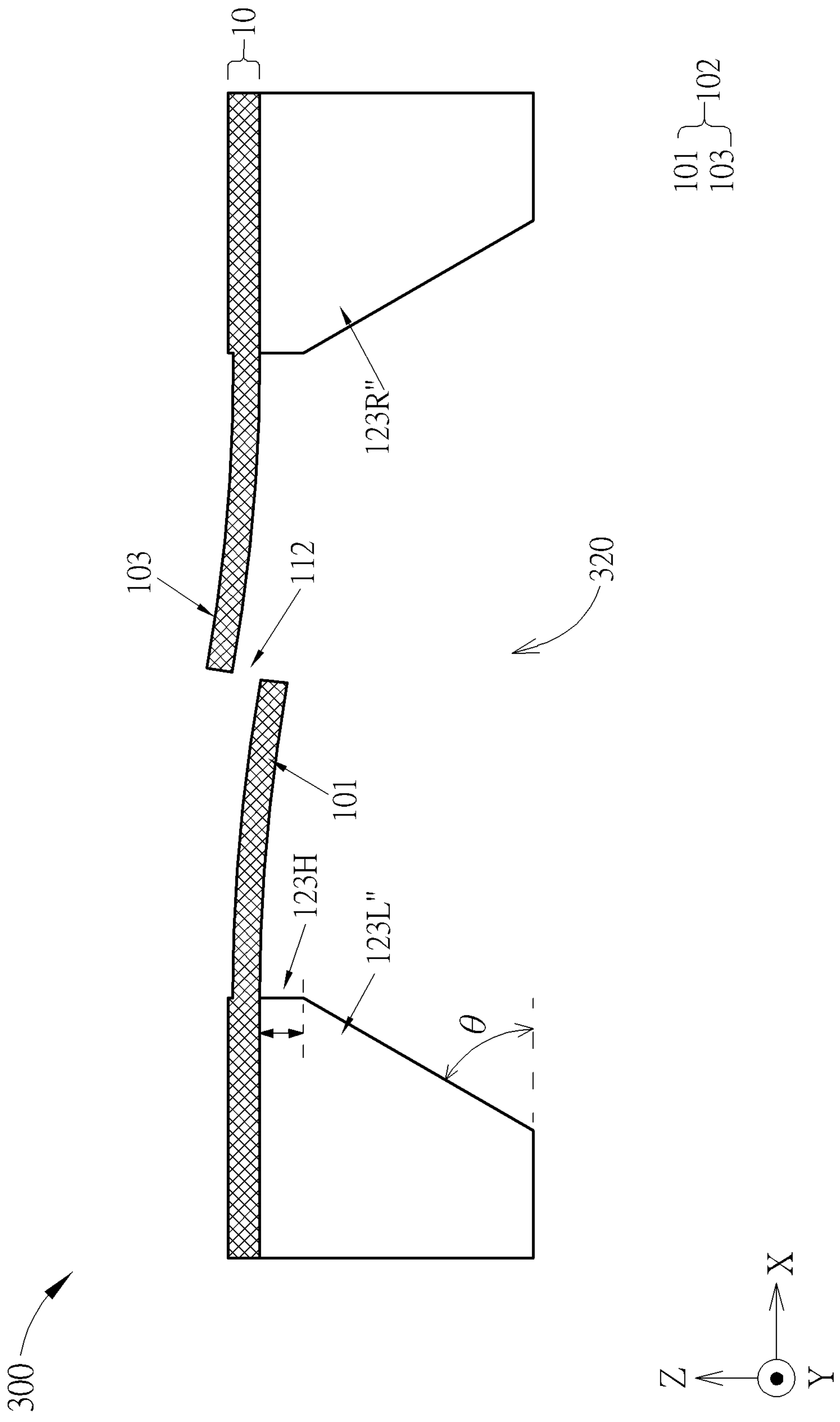
FIG. 8 is a schematic diagram of an air-pulse generating device according to an embodiment of the present invention.
Figure 9:
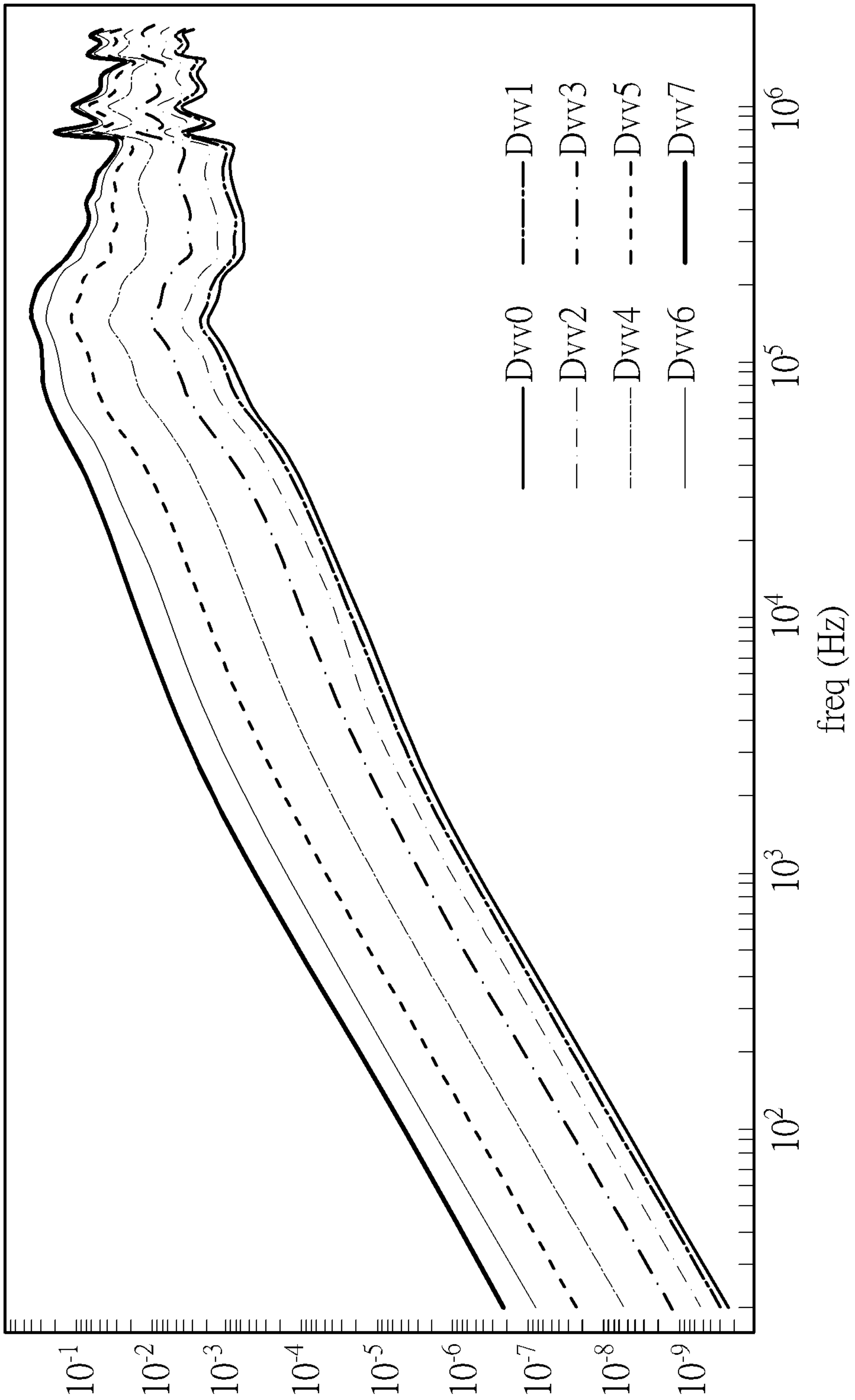
FIG. 9 illustrates frequency responses of energy transfer ratio of the device in FIG. 1.
Figure 10:
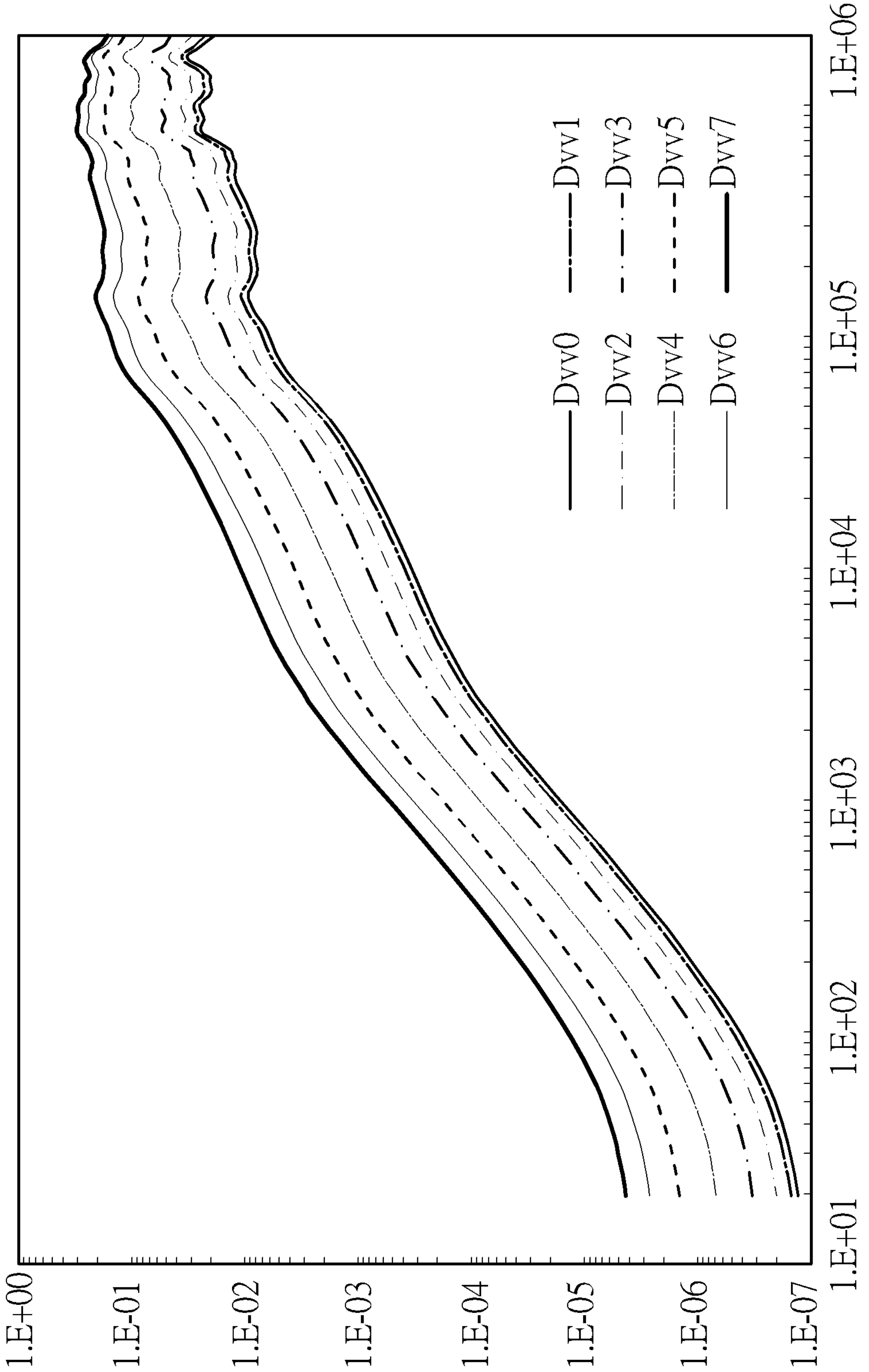
FIG. 10 illustrates frequency responses of energy transfer ratio of the device in FIG. 8.
Figure 11:
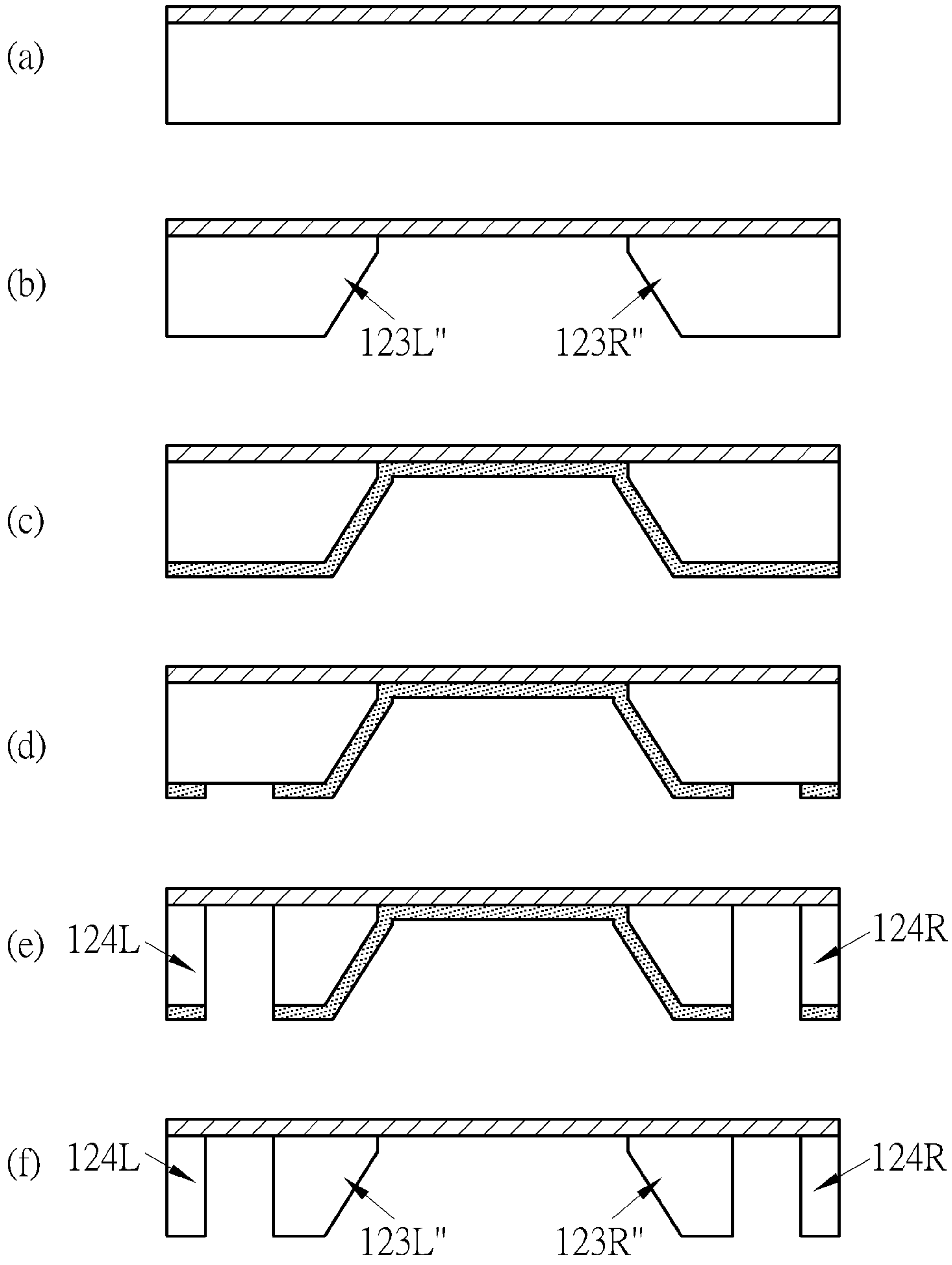
FIG. 11 illustrates a process of a manufacturing method for the device in FIG. 8.
Figure 12:
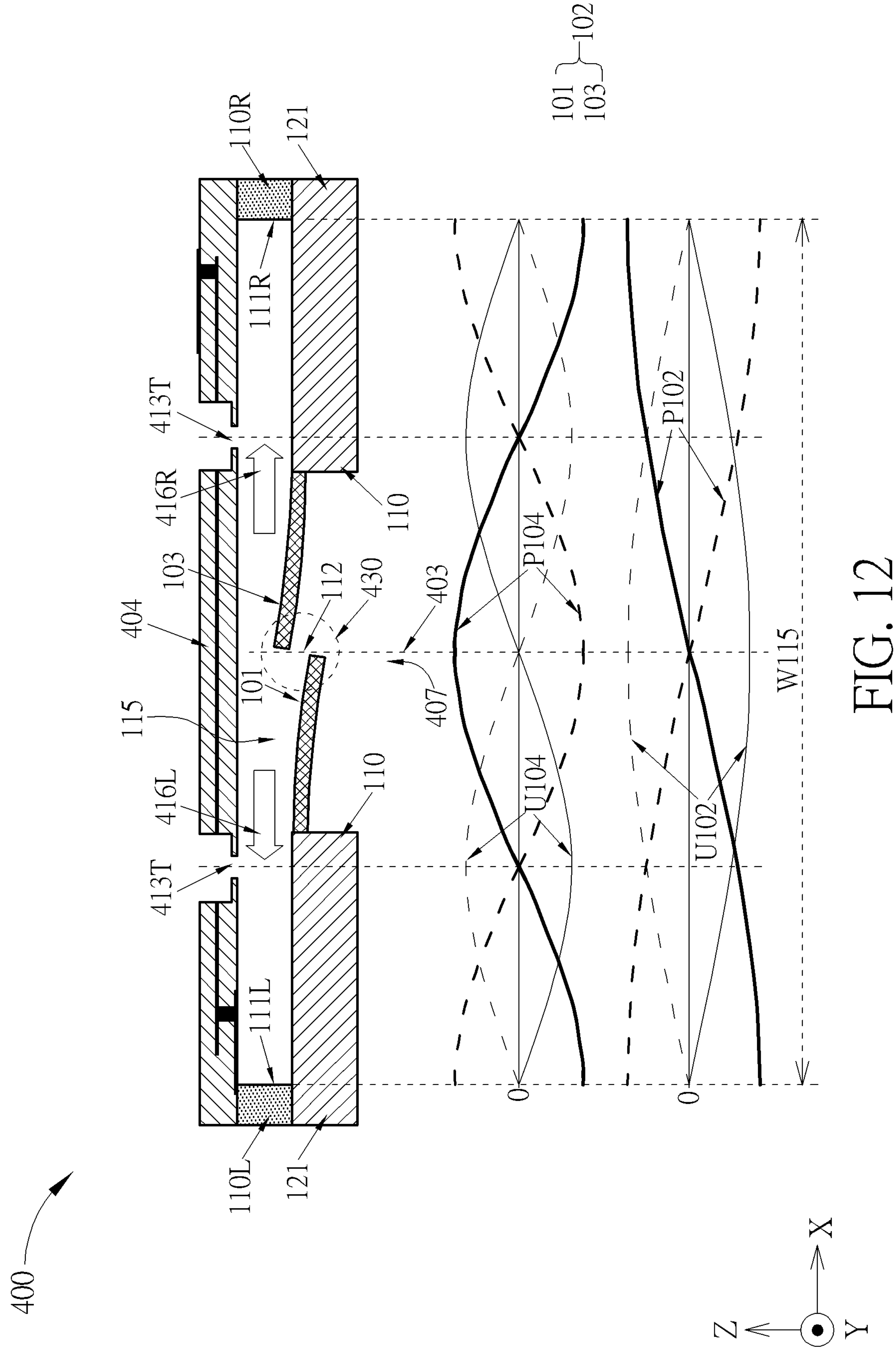
FIG. 12 is a schematic diagram of an air-pulse generating device according to an embodiment of the present invention.

FIG. 12 is a schematic diagram of an APG device 400 according to an embodiment of the present invention. The device 400 is modified from FIG. 7 of U.S. application Ser. No. 17/553,806 and similar to the device 100 shown in FIG. 1 of the present invention. Different from the device 100, the device 400 comprises only flap pair 102 (but no flap pair 104). The flap pair 102 is configured to perform both the modulation operation (which is to form amplitude-modulated air pressure variation with the ultrasonic carrier frequency $f_{UC}$) as well as the demodulation operation (which is to form the opening 112, synchronous to the amplitude-modulated ultrasonic carrier at frequency $f_{UC}$, to produce air pulses according to the envelope of the said amplitude-modulated ultrasonic air pressure variation).

In FIGS. 12, U104 and P104 represent pressure profile and airflow profile formed by the flap pair 102 in response to the modulation-driving signal SM, and U102 and P102 represent pressure profile and airflow profile formed by the flap pair 102 in response to the demodulation-driving signal ±SV. Herein the demodulation-driving signal is denoted by ±SV to emphasize the flap pair 102 is driven differentially (which implies the demodulation-driving signals +SV and −SV have the same magnitude but opposite polarity) to perform the demodulation operation. For example, S101 and/or S103 above may be represented by −SV and/or +SV.

In other words, modulator and demodulator are co-located at/as the flap pair 102. Like the device 100, the film structure 10 of the flap pair 102 of the device 400 is actuated to have not only a common mode movement to perform the modulation and a differential mode movement to perform the demodulation.

In other words, the "modulation operation" and the "demodulation operation" are performed by the same flap pair 102, at the same time. This colocation of "modulation operation" together with "demodulation operation" is achieved by new driving signal wiring schemes such as those shown in FIG. 13. Given that the device 400 may comprise an actuator 101A/103A disposed on the flap 101/103 and the actuator 101A/103A comprises a top electrode and a bottom electrode, both of the top and bottom electrodes may receive the modulation driving signal SM and the demodulation-driving signal ±SV.

Figure 13:
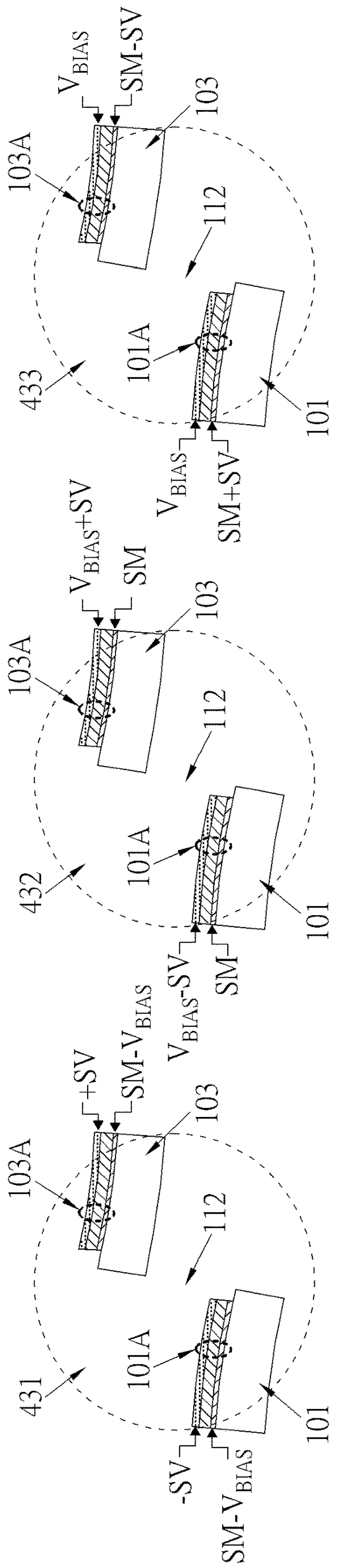
FIG. 13 illustrates driving signal wiring schemes according to embodiments of the present invention.

In an embodiment, one electrode of the actuator 101A/103A may receive the common mode modulation-driving signal SM; while the other electrode may receive the differential mode demodulation-driving signal S101(−SV)/S103(+SV). For example, diagrams 431 to 433 shown in FIG. 13 illustrate details of a region 430 shown in FIG. 12. As shown in the diagrams 431 and 432, bottom electrodes of the actuator 101A/103A receive the common mode modulation-driving signal SM; while top electrodes of the actuator 101A/103A receive the differential mode demodulation-driving signal S101(−SV)/S103(+SV). A suitable bias voltage $V_{BIAS}$ may be applied to either the bottom electrode (like diagram 432 shows) or the top electrode (like diagram 433 shows), where the bias voltage $V_{BIAS}$ can be determined according to practical requirement.

In an embodiment (shown in diagram 433), one electrode of the actuator 101A/103A may receive both the common mode modulation-driving signal SM and differential mode demodulation-driving signal S101(−SV)/S103(+SV); while the other electrode is properly biased. In the embodiment shown in diagram 433, the bottom electrodes receive the common mode modulation-driving signal SM and differential mode demodulation-driving signal S101(−SV)/S103(+SV); while the top electrode are biased.

The driving signal wiring schemes shown in FIG. 13 achieve a goal that, (without considering $V_{BIAS}$) an applied signal of one actuator (e.g., 101A) is or comprises −SM−SV while an applied signal of the other actuator (e.g., 103A) is or comprises −SM+SV. Note that, driving signal wiring schemes may be modified or altered according to practical situation/requirement. As long as a common-mode signal component between the two applied signals applied on the flap pair 102 comprises the modulation-driving signal SM (plus $V_{BIAS}$) and a differential-mode signal component between the two applied signals applied on the flap pair 102 comprises the demodulation-driving signal SV, requirements of present invention is satisfied and is within the scope of the present invention. Herein (or generally), a common-mode signal component between two arbitrary signals a and b may be expressed as (a+b)/2; while a differential-mode signal component between two arbitrary signals a and b may be expressed as (a-b)/2.

Further note that, in order to minimize the cross coupling between the modulation operation (as a result of driving signal SM) and the demodulation operation (as a result of driving signal ±SV), in an embodiment, the flaps 101 and 103 are made into a mirrored/symmetric pair in both their mechanical construct, dimension and electrical characteristics. For instance, the cantilever length of flap 101 should equal that of 103; the membrane structure of flap 101 should be the same as flap 103; the location of virtual valve 112 should be centered between, or equally spaced from, the two supporting walls 110 of flap 101 and flap 103; the actuator pattern deposited on flap 101 should mirror that of flap 103; the metal wiring to actuators deposited atop flap 101 and 103 should be symmetrical. Herein, a few items are names for mirrored/symmetric pair (or the flaps 101 and 103 are mirrored/symmetric), but not limited thereto.

Figure 14:
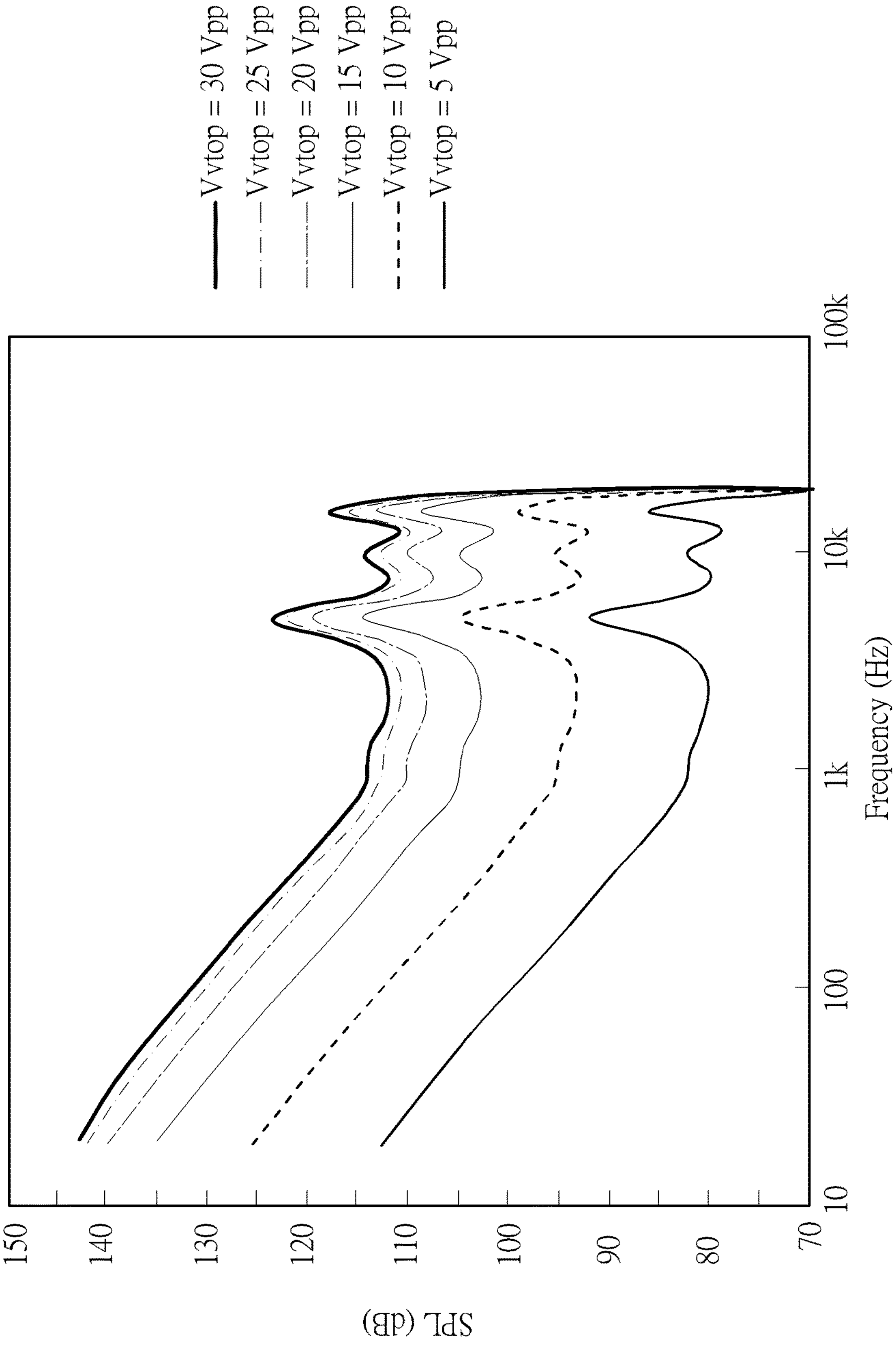
FIG. 14 illustrates SPL measurement results versus frequency of the device of FIG. 12.

FIG. 14 illustrates a sets of frequency response measurement results of a physical embodiment of the device 400 in an IEC711 occluded ear emulator, where driving scheme shown in diagram 431 is used to drive the device 400, Vrms for modulation-driving signal SM for bottom electrodes is 6 Vrms, Vpp (peak-to-peak voltage) for demodulation-driving signal ±SV for top electrodes is swept from 5 Vpp to 30 Vpp, and a GRAS RA0401 ear simulator is used for measuring acoustic results. Operating frequency (i.e., ultrasonic carrier frequency $f_{UC}$) of the device 400 is 160 KHz, and the device dimension is designed accordingly (e.g., W115$\approx\lambda_{UC}$=C/$f_{UC}\approx$2.10 mm for C=336 m/s). As can be seen from FIG. 14, the device 400 is able to produce sound of high SPL at low frequency band (at least 99 dB for frequency less than 100 Hz).

Figure 15:
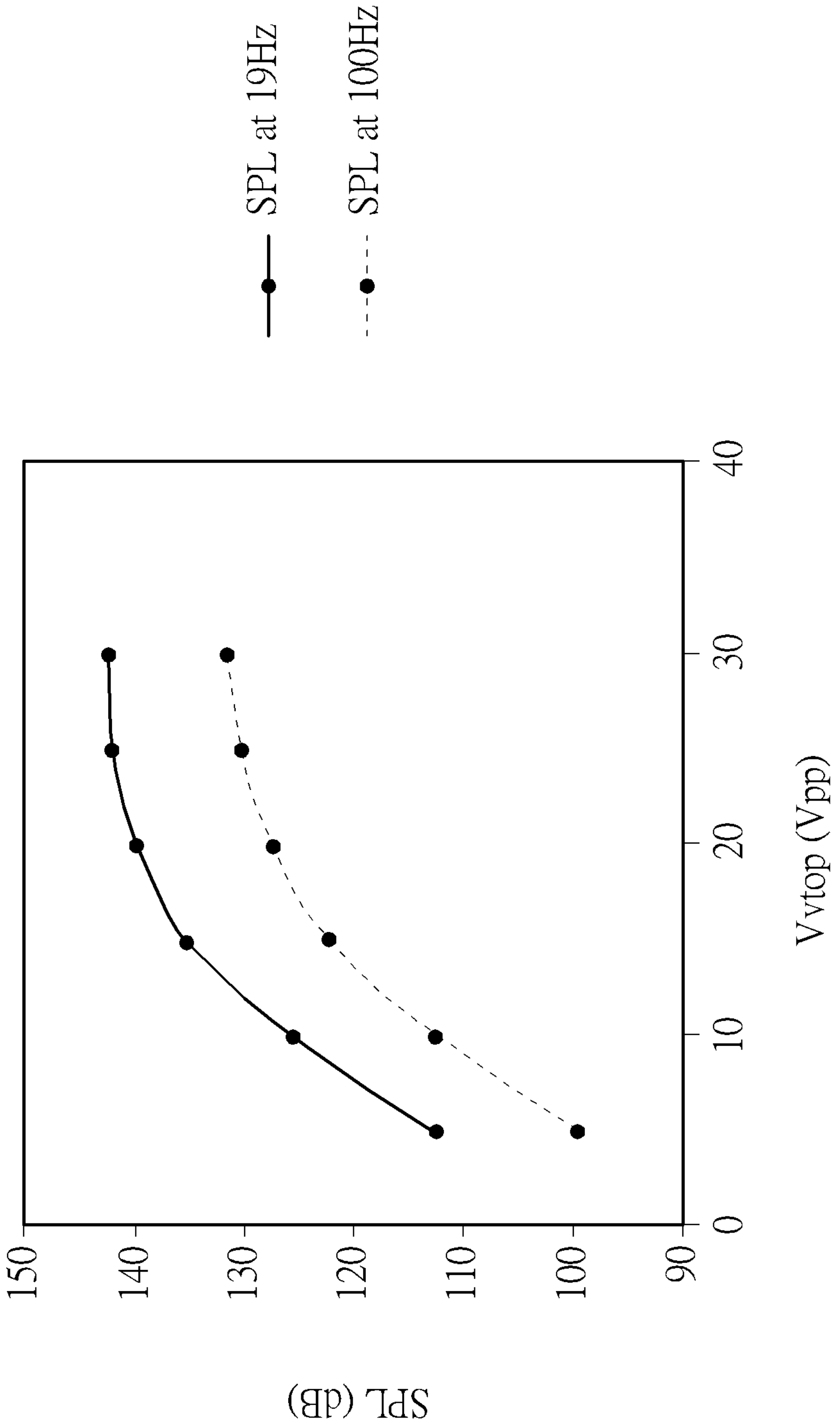
FIG. 15 illustrates SPL measurement results versus peak-to-peak voltage of the device of FIG. 12.
Figure 16:
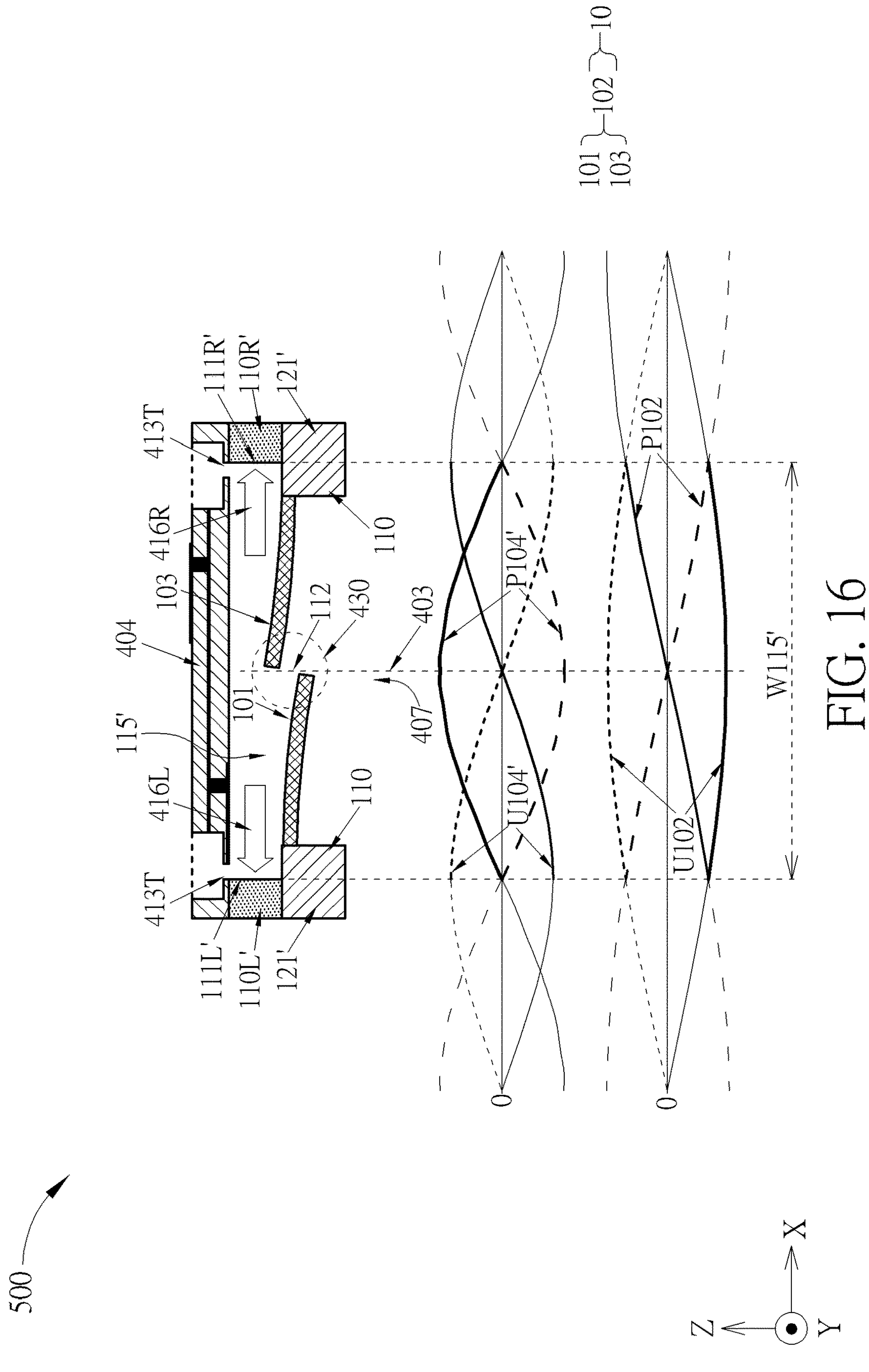
FIG. 16 is a schematic diagram of an air-pulse generating device according to an embodiment of the present invention.

Furthermore, FIG. 15 illustrates analysis of measurement results of the device 400 shown in FIG. 14. In FIG. 15, the SPL at 100 Hz (bold dashed line) and 19 Hz (bold solid line) of FIG. 14 is plotted versus Vvtop (Vpp), where Vvtop (Vpp) is the peak-to-peak voltage for the demodulation-driving signal applied on the top electrodes, as shown in connection diagram 431. It can be seen from FIG. 14 and FIG. 15 that SPL increases as Vvtop increases. In addition, simulation results of equivalent lumped-circuit model of the device 100 also concurred that SPL increases as amplitude of (valve-driving or) demodulation-driving signal increases. Therefore, it can be obtained that a volume of a sound produced by the air-pulse generating device of the present invention may be controlled via an amplitude of the demodulation-driving signal.

Based on the results from FIG. 14 and FIG. 15, it can be concluded that the concept of modulator-demodulator co-location is validated, meaning that modulation (forming amplitude-modulated ultrasonic air pressure variation) and demodulation (forming opening synchronously to produce asymmetric air pulses) performed by the device 400 successful produce APPS effect. Hence, it may be possible to shrink the chamber width (e.g., W115 of the device 100).

Figure 17:
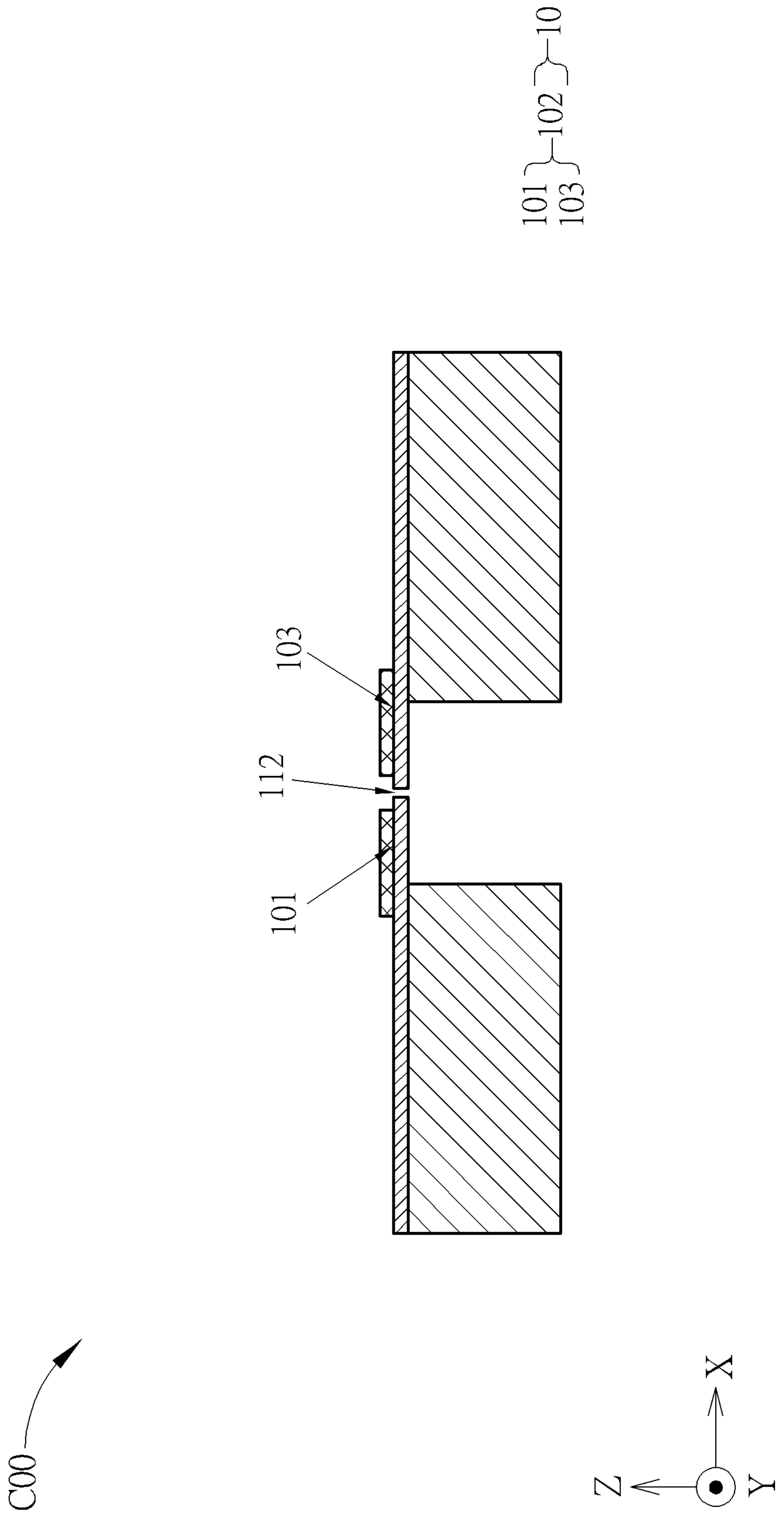
FIG. 17 is a schematic diagram of an air-pulse generating device according to an embodiment of the present invention.

FIG. 17 is a schematic diagram of an APG device C00 according to an embodiment of the present invention. The deice C00 is similar to the APG devices previously introduced, which comprise the flaps 101 and 103. The flaps 101 and 103 may also be driven by the driving scheme shown in FIG. 13.

Different from those devices, the device C00 comprises no cap structure. Compared to the APG devices introduced above, the device C00 has much simple structure, requiring less photolithographic etching steps, done away complicated conduit fabrication steps, and avoid the need to bound two sub-components or subassemblies together. Production cost of the device C00 is reduced significantly.

Since there is no chamber formed under the cap structure to be compressed, the acoustic pressure generated by the device C00 arise mainly out of the acceleration of the flaps (101 and 103) movement. By aligning the timing of opening of the virtual valve 112 (in response to the demodulation-driving signal ±SV) to the timing of acceleration of common mode movement of the flaps 101 and 103 (in response to the modulation-driving signal SM), the device C00 would be able to produce asymmetric air (pressure) pulses.

Note that, the space surrounding flaps 101 and 103 is divided into two subspaces: one in Z>0, or +Z subspace, and one in Z<0, or −Z subspace. For any common mode movements of flaps 101 and 103, a pair of acoustic pressure waves will be produced, one in subspace +Z, and one in the subspace −Z. These two acoustic pressure waves will be of the same magnitude but of opposite polarities. As a result, when the virtual valve 112 is opened, the pressure difference between the two air volumes in the vicinity of the virtual valve 112 would neutralize each other. Therefore, when the timing of differential mode movement reaching its peak, i.e. the timing VV 112 reaches its maximum opening, is aligned to the timing of acceleration of common mode movement reaching its peak, the acoustic pressure supposed to be generated by the common mode movement shall be subdued/eliminated due to the opening of the virtual valve 112, causing the auto-neutralization between two acoustic pressures on the two opposite sides of the flaps 101 and 103, where the two acoustic pressures would have same magnitude but opposite polarities. It means, when the virtual valve 112 is opened, the device C00 would produce (near) net-zero air pressure. Therefore, when the opened period of the virtual valve 112 overlaps a time period of one of the (two) polarities of acceleration of common mode flaps movement, the device C00 shall produce single-ended (SE) or SE-liker air pressure waveform/pulses, which are highly asymmetrical.

In the present invention, SE(-like) waveform may refers that the waveform is (substantially) unipolar with respect to certain level. SE acoustic pressure wave may refer to the waveform which is (substantially) unipolar with respect to ambient pressure (e.g., 1 ATM).

Note that, the opening of virtual valve 112 does not determine the strength/amplitude of the acoustic pressure pulse, but determines how strong is the "near net-zero pressure" (or the auto-neutralization) effect. When the virtual valve 112 opening is wide, the "net-zero pressure" effect is strong, the auto-neutralization is complete, the asymmetry will be strong/obvious, resulting in strong/significant baseband signal or APPS effect. Conversely, when the virtual valve 112 open is narrow, the "net-zero pressure" effect is weak, the auto-neutralization is incomplete, lowering the asymmetry, resulting in weak baseband signal or APPS effect.

In an FEM simulation, the device C00 can produce 145 dB SPL at 20 Hz. From the FEM simulation, it is observed that, even though the SPL produced by the device C00 is about 12 dB lower than which produced by the device 600 (about 157 dB SPL at 20 Hz), under the same driving condition, THD (total harmonic distortion) of the device C00 is 10~20 dB lower than which of the device 600. Hence, the simulation validates the efficacy of the device C00, the APG device without cap structure or without chamber formed therewithin.

Please note that, the statement of the timing of VV opening being aligned to the timing of peak pressure within the chamber or peak velocity/acceleration of common mode membrane movement implicitly implies that a tolerance of ±e% is acceptable. That is, the case of the timing of VV opening being aligned to (1±e%) of peak pressure within the chamber or peak velocity/acceleration of common mode membrane movement is also within the scope of present invention, where e% may be 1%, 5% or 10%, depending on practical requirement.

Figure 18:
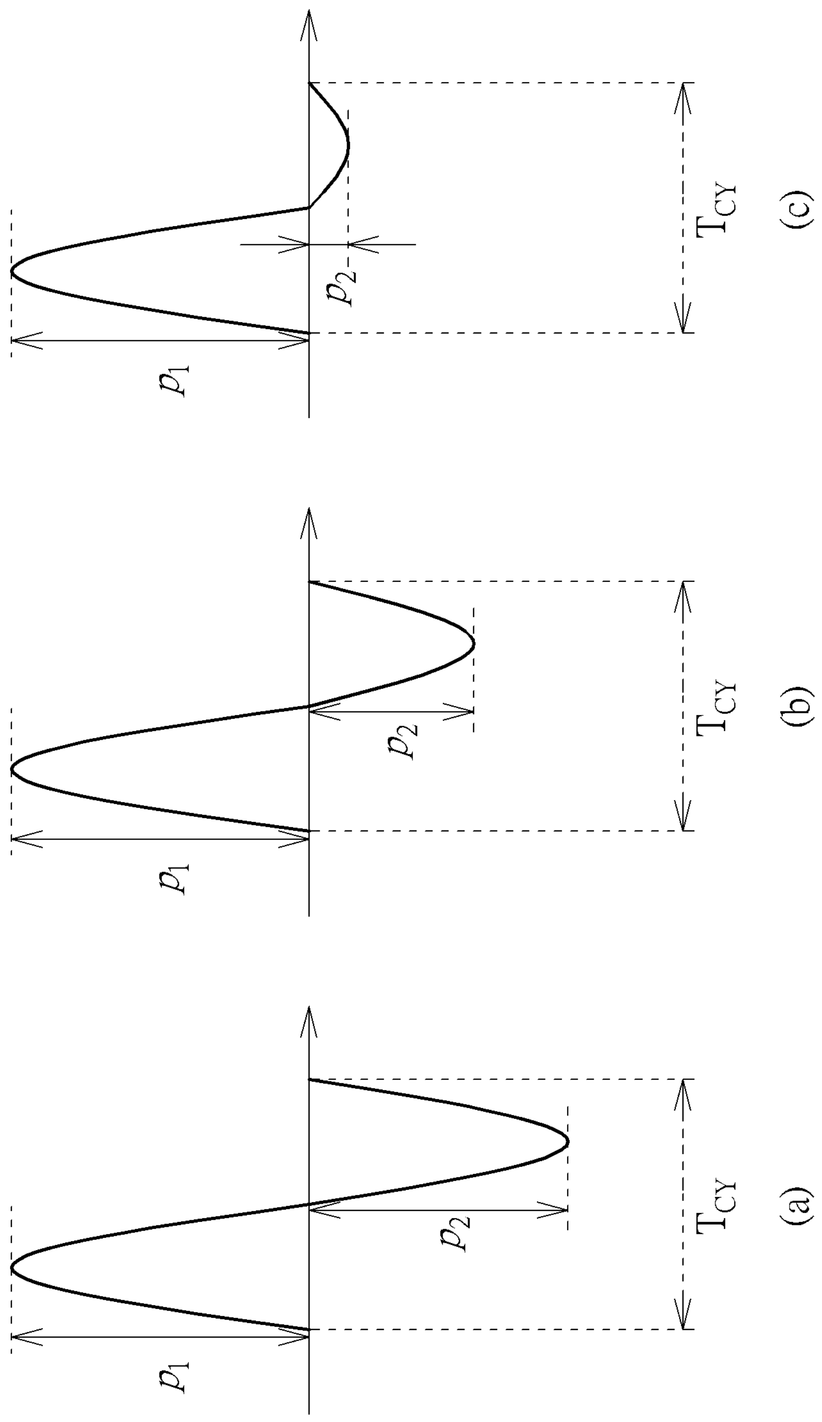
FIG. 18 illustrates full-cycle pulses within one operating cycle with different degrees of asymmetricity.

As for the pulse asymmetricity, FIG. 18 illustrates full-cycle pulses (within one operating cycle $T_{CY}$) with different degrees of asymmetricity. In the present invention, degree of asymmetricity may be evaluated by a ratio of $p_2$ to $p_1$, where $p_1>p_2$, $p_1$ represents a peak value of a first half-cycle pulse with a first polarity with respect to a level, and $p_2$ represents a peak value of a second half-cycle pulse with a second polarity with respect to the level. In acoustic area, the level may be corresponding to ambient condition, either ambient pressure (zero acoustic pressure) or zero acoustic airflow, where air pulses in the present invention may refer to either airflow pulses or air pressure pulses.

FIG. 18 (*a*) illustrates a full-cycle pulse with $r=p_2/p_1>80\%$. The full-cycle pulse shown in FIG. 18 (*a*) or with $r=p_2/p_1\approx 1$ has low degree of asymmetricity. FIG. 18 (*b*) illustrates a full-cycle pulse with $40\%\le r=p_2/p_1\le 60\%$. The full-cycle pulse shown in FIG. 18 (*b*) or with $r=p_2/p_1\approx 50\%$ has median degree of asymmetricity. FIG. 18 (*c*) illustrates a full-cycle pulse with $r=p_2/p_1<30\%$. The full-cycle pulse shown in FIG. 18 (*c*) or with $r=p_2/p_1\to 0$ has high degree of asymmetricity.

As discussed in the above, the higher the degree of asymmetricity is, the stronger the APPS effect and baseband spectrum components of the ultrasonic air pulses will be. In the present invention, asymmetric air pulse refers to air pulse with at least median degree of asymmetricity, meaning $r=p_2/p_1\le 60\%$.

Note that, the demodulation operation of the APG device of the present invention is to produce asymmetric air pulses according to the amplitude of ultrasonic air pressure variation, which is produced via the modulation operation. In one view, the demodulation operation of the present invention is similar to the rectifier in AM (amplitude modulation) envelope detector in radio communication systems.

In radio communication systems, as known in the art, an envelope detector, a kind of radio AM (noncoherent) demodulator, comprises a rectifier and a low pass filter. The envelope detector would produce envelope corresponding to input amplitude modulated signal thereof. The input amplitude modulated signal of the envelop detector is usually highly symmetric with $r=p_2/p_1\to 1$. One goal of the rectifier is to convert the symmetric amplitude modulated signal such that rectified amplitude modulated signal is highly asymmetric with $r=p_2/p_1\to 0$. After low pass filtering the highly asymmetric rectified AM signal, the envelope corresponding to the amplitude modulated signal is recovered.

The demodulation operation of the present invention, which turns symmetric ultrasonic air pressure variation (with $r=p_2/p_1\to 1$) into to asymmetric air pulses (with $r=p_2/p_1\to 0$), is similar to the rectifier of the envelope detector as AM demodulator, where the low pass filtering operation is left to natural environment and human hearing system (or sound sensing device such as microphone), such that sound/music corresponding to the input audio signal $S_{IN}$ can be recovered, perceived by listener or measured by sound sensing equipment.

It is crucial for the demodulation operation of the APG device to create asymmetricity. In the present invention, pulse asymmetric relies on proper timing of opening which is aligned to membrane (flaps) movement which generates the ultrasonic air pressure variation. Different APG constructs would have different methodology of timing alignment. In other words, a timing of forming the opening 112 is designated such that the plurality of air pulses produced by the APG device is asymmetric.

APG device producing asymmetric air pulses may also be applied to air pump/movement application, which may be applied on heat dissipation, ventilation, or have cooling, drying or other functionality. In this regards, APG device of the present invention may be also viewed as (a kind of) airflow generating device.

Note that, conventional speaker (e.g., dynamic driver) using physical surface movement to generate acoustic wave faces problem of front-/back-radiating wave cancellation. When physical surface moves to cause airmass movement, a pair of soundwaves, i.e., front-radiating wave and back-radiating wave, are generated. The two soundwaves would cancel most of each other out, causing net SPL being much lower than the one that front-/back-radiating wave is measured alone.

Commonly adopted solution for front-/back-radiating wave canceling problem is to utilize either back enclosure or open baffle. Both solutions require physical size/dimension which is comparable to wavelength of lowest frequency of interest, e.g., wavelength as 1.5 meter of frequency as 230 Hz.

Compared to conventional speaker, the APG device of the present invention occupies only tens of square millimeters (much smaller than conventional speaker), and produces tremendous SPL especially in low frequency.

It is achieved by producing asymmetric amplitude modulated air pulses, where the modulation portion produces symmetric amplitude modulated air pressure variation via membrane movement and the demodulation portion produces the asymmetric amplitude modulated air pulses via virtual valve. The modulation portion and the demodulation portion are realized by flap pair(s) fabricated in the same fabrication layer, which reduces fabrication/production complexity. The modulation operation is performed via common mode movement of flap pair and the demodulation operation is performed via differential mode movement of flap pair, wherein the modulation operation (via common mode movement) and the demodulation operation (via differential mode movement) may be performed by single flap pair. Proper timing alignment between differential mode movement and common mode movement enhances asymmetricity of the output air pulses.

As mentioned earlier, the APG device of the present application may function as a (miniature) air pump, be capable of producing asymmetric air pulses, and can be applied in cooling, drying, dehumidifying, heat dissipation and/or ventilation applications, where the (asymmetric) air pulses are produced to form a net air movement constantly in one direction.

Furthermore, the APG device of the present invention for airflow applications may be disposed within an air quality sensing device, which is to sense, e.g., a density of specific particle(s) (e.g., PM 2.5 or PM 10 (PM: Particulate Matter)) or compound(s) (e.g., Ozone ($O_3$), nitrogen dioxide ($NO_2$), sulfur dioxide ($SO_2$) and carbon monoxide (CO)) in the air. Hence, a size of the air quality sensing device may be significantly reduced.

Figure 20:
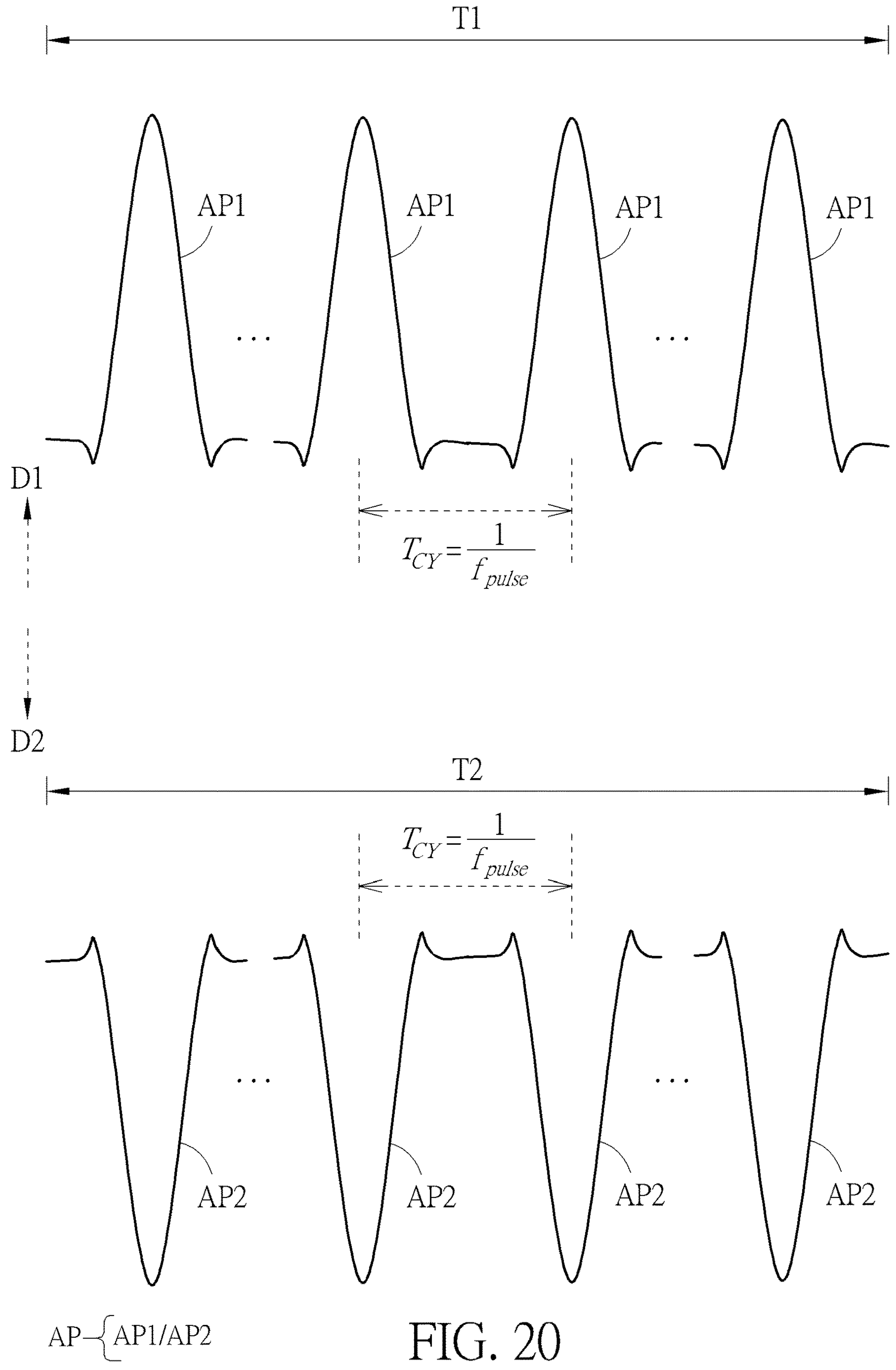
FIG. 20 is a schematic diagram of air pulses AP according to an embodiment of the present invention.

For example, FIG. 20 illustrates a schematic diagram of air pulses AP according to an embodiment of the present invention. The air pulses may be generated by the APG device of present application (e.g., C00, 500, or 100), which comprises a film structure (e.g., 10). As mentioned earlier, the film structure of the APG device may be actuated to perform a movement to generate the air pulses AP at an ultrasonic pulse rate $f_{pulse}$ (e.g., 96 KHz or 192 KHz), which may be a reciprocal of the operating cycle $T_{CY}$ of the ultrasonic carrier frequency $f_{UC}$ for example. In this case, the ultrasonic pulse rate $f_{pulse}$ may be the ultrasonic carrier frequency $f_{UC}$. The air pulses AP may produce a net airflow toward a single direction. As a result, the APG device may function as a (miniature) air pump.

In an embodiment, first air pulses AP1 may produce a first net airflow constantly toward one single direction, e.g., a first direction D1. Taking FIG. 20 as an example, during the first period of time T1, the air pulses AP are all toward first direction D1. When the first time period T1 is at least or longer than a reciprocal of a minimum audible frequency, the first net airflow produced by the first air pulses AP1 may be considered as constantly toward one single direction D1. For example, for a minimum audible frequency being acknowledged as 10 Hz, when the first time period T1 is at least or longer than 0.1 second, the first net airflow may be considered as constantly toward one single direction D1. Note that, first amplitude(s), corresponding to the first air pulses AP1 toward the first direction D1, may or may not be the same.

On the other hand, the APG device may produce second air pulses AP2, and the second air pulses AP2 may produce a second net airflow constantly toward a second direction D2, opposite to the first direction D1. In an embodiment, when the APG device produces significant airflow or air movement and the air pulses toggling between the first direction D1 and the second direction D2 is not discernible, the first net airflow may be considered as constantly toward direction D1 during period T1, and/or the second net airflow may be considered as constantly toward direction D2 during period T2.

The film structure may be actuated by a demodulating-driving signal (e.g., ±SV) and a modulating-driving signal (e.g., SM). Note that, in the present application, SM may be referred to modulation signal, which is also a kind of driving signal. Similarly, ±SV may be referred to demodulation signal, which is also a kind of driving signal.

Figure 21:
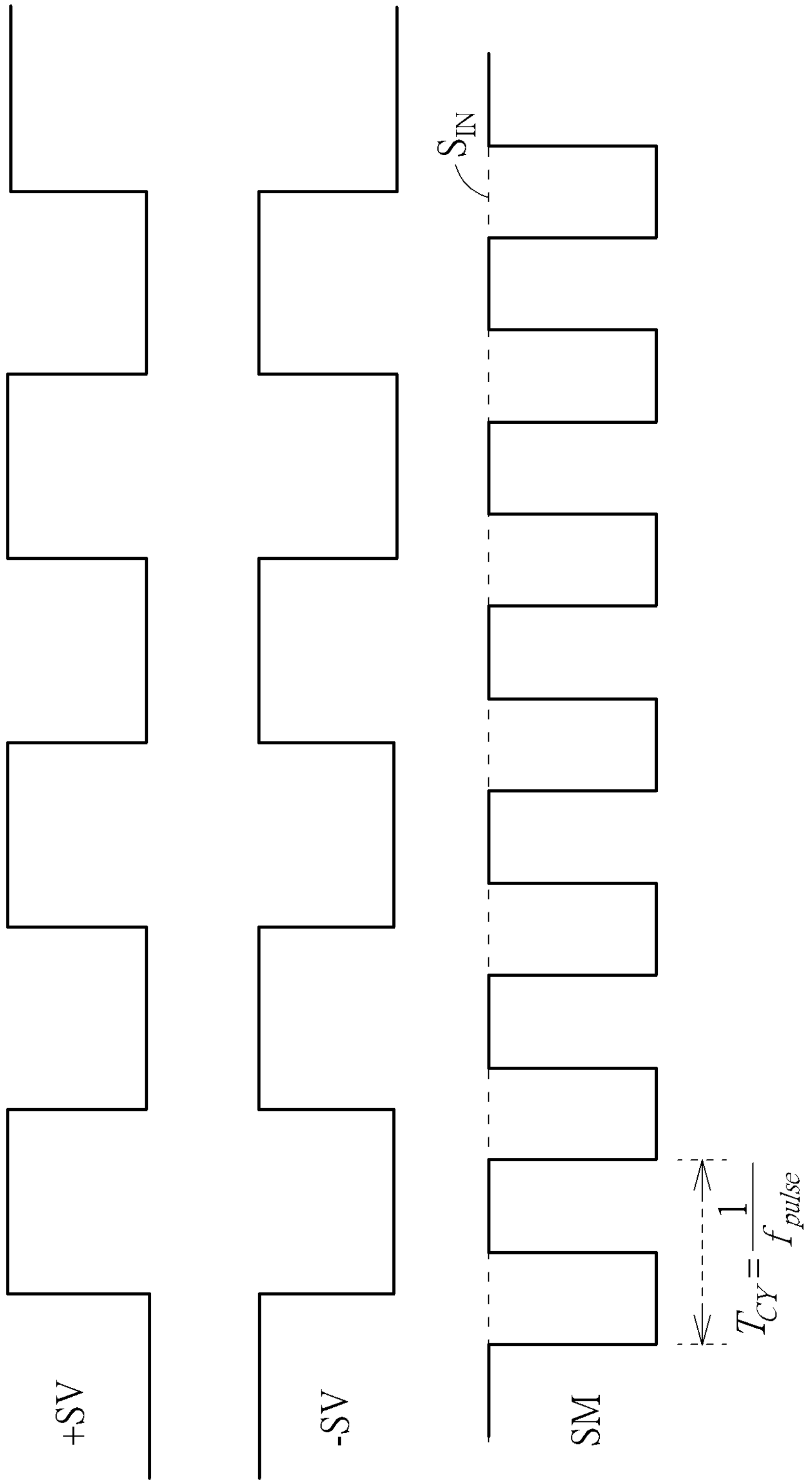
FIG. 21 illustrates waveforms of demodulation signals and a modulation signal according to an embodiment of the present invention.

Apart from FIG. 2, FIG. 21 illustrates schematic waveforms of the demodulation signals ±SV and the modulation signal SM according to another embodiment of the present invention, neglecting transition between high/low voltages thereof. As shown in FIG. 21, the modulation/driving signal SM may be generated according to an input signal (e.g., $S_{IN}$), which comprises a (nonzero) direct current (DC) offset. In other words, the input signal may be simply a DC signal, but not limited thereto.

In an embodiment, the DC offset may be related to the direction of the net airflow. For example, during a first period of time T1, the air pulses (AP) may produce a first net airflow constantly toward the first direction D1 in response to the DC offset being positive. On the other hand, during a second period of time T2, the air pulses generated by the APG device may produce the second net airflow constantly toward the second direction D2, which is opposite to the first direction D1, in response to the DC offset being negative. In this regard, the APG device or airflow generating device of the present invention may be viewed as a voltage-to-airflow converter, which can convert voltage into airflow.

In addition to polarity of the DC offset, the direction of net airflow may also be determined/controlled via phase between the modulation signal (SM) and the demodulation signal (±SV). For example, in FIG. 21, transitions of the demodulation signal ±SV are aligned to interval of the modulation signal SM being low. In this case, the APG device may produce airflow toward a third direction for example. When (phase of) the demodulation signal ±SV is shifted such that transitions of the demodulation signal ±SV are aligned to interval of the modulation signal SM being high, the APG device would produce airflow toward a fourth direction opposite to the third direction. In short, the direction of the net airflow produce by the APG device may be determined/controlled via phase (difference) between the modulation signal and the demodulation signal.

The strength/volume of a net airflow may be related to or a function of the magnitude of the DC offset. By maintaining an airflow direction (either the first direction or the second direction), the APG device is able to dissipate heat, dehumidify, provide ventilation, or facilitate air circulation. In this case, the APG device can be regarded as a bladeless fan. That is, C00, 500, or 100 may also be regarded as bladeless fan, especially when the driving signal or modulation-driving signal applied thereto is generated according to an input signal comprising nonzero DC component/offset. In the present invention, the terms of APG device, airflow generating device and blower may be used interchangeably, which means device 100, 500, C00, or K00, for example, may also be viewed as airflow generating device or blower.

Alternatively, as shown in FIG. 2, the input audio signal $S_{IN}$ may be an electrical representation of an audio sound signal, such as music. Note that, the input audio signal $S_{IN}$ comprising alternating current (AC) audio component may further comprise a nonzero DC voltage/offset. The modulation signal SM may be generated according to the input (audio) signal $S_{IN}$ including the DC offset. In this case, the APG device or bladeless fan can produce sound while generate unidirectional net airflow at the same time.

In an embodiment, the APG device, airflow generating device or bladeless fan may be disposed within a wearable sound device (such as an earbud), which will be discussed later. When the APG device, airflow generating device or bladeless fan is disposed within the wearable sound device, the APG device, airflow generating device or bladeless fan is able to achieve ear canal drying/cooling and music playing at the same time.

Figure 22:
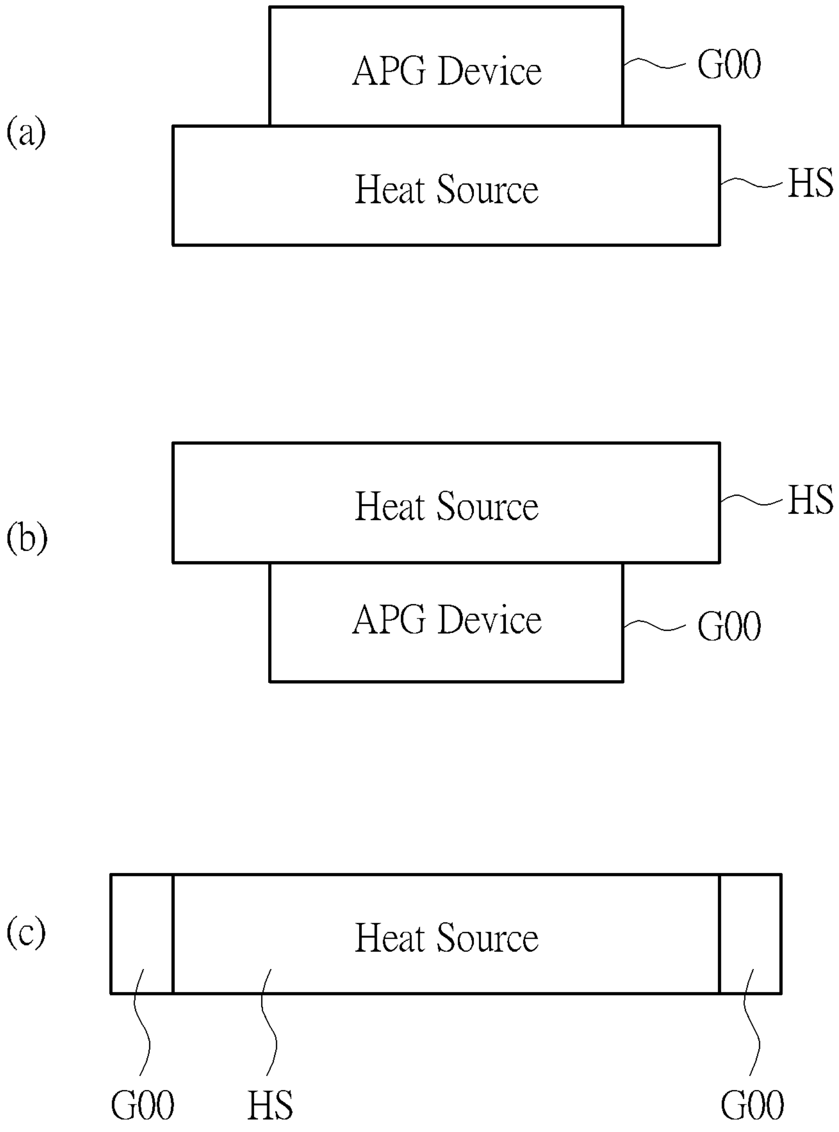
FIG. 22 is a schematic diagram of different configuration of an APG device according to embodiments of the present invention.

As mentioned above, the airflow generating device, APG device or bladeless fan may be used in heat dissipation applications. To dissipate heat from a heat source, the APG device may be strategically positioned near a heat source. For example, FIG. 22 is a schematic diagram of different configurations of an APG device G00 according to embodiments of the present invention. FIG. 22 (*a*), (*b*), and (*c*) illustrate the APG device G00 disposed on, under, or by a heat source HS, respectively. The heat source HS may be a CPU, GPU, or any component generating heat. The APG device G00 and/or the heat source HS may be disposed within a housing of an electronic/host device (e.g., a host computer, a wearable sound device, a laptop, a tablet, a mobile phone, an augmented reality device, a virtual reality device, or a mixed reality device).

Figure 23:
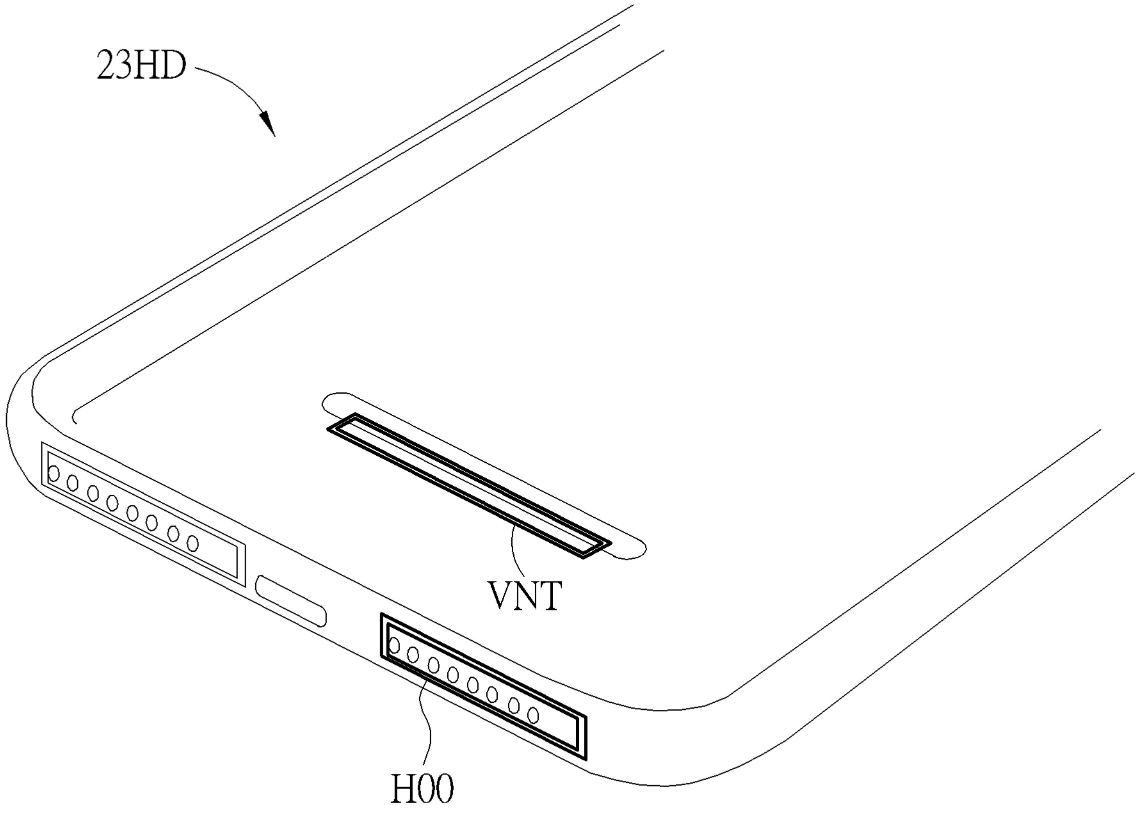
FIG. 23 is a schematic diagram of an APG device of a host device according to an embodiment of the present invention.

FIG. 23 is a schematic diagram of an APG device H00 of a host device 23HD according to an embodiment of the present invention. For the APG device H00 integrated within the host device 23HD to produce air flow, the host device 23HD may comprise proper vent(s) VNT to establish such air flow. The vents VNT may be multiple holes along edge(s)/side(s) of the host device 23HD, placed strategically to facilitate the desired (cooling/drying) airflow. In an embodiment, the host device 23HD may be a personal/portable device such as personal/portable phone, but not limited thereto.

When there is one APG device (e.g., H00) in a chamber (or the host device 23HD), the APG device (H00) may be operated in a pump-in mode. In the pump-in mode, air enters the host device 23HD through the APG device H00, and the vent(s) VNT may act as outlet(s) for the established air flow. When water is detected by the APG device H00, the APG device H00 for water damage prevention may stop pumping right away to prevent an ingress of water into the host device 23HD. Alternatively, the APG device H00 may be operated in a net pump-out mode, and the internal space of the host device 23HD may be in an underpressurized state to pull a net air flow into the host device 23HD through the vent(s) VNT.

Figure 24:
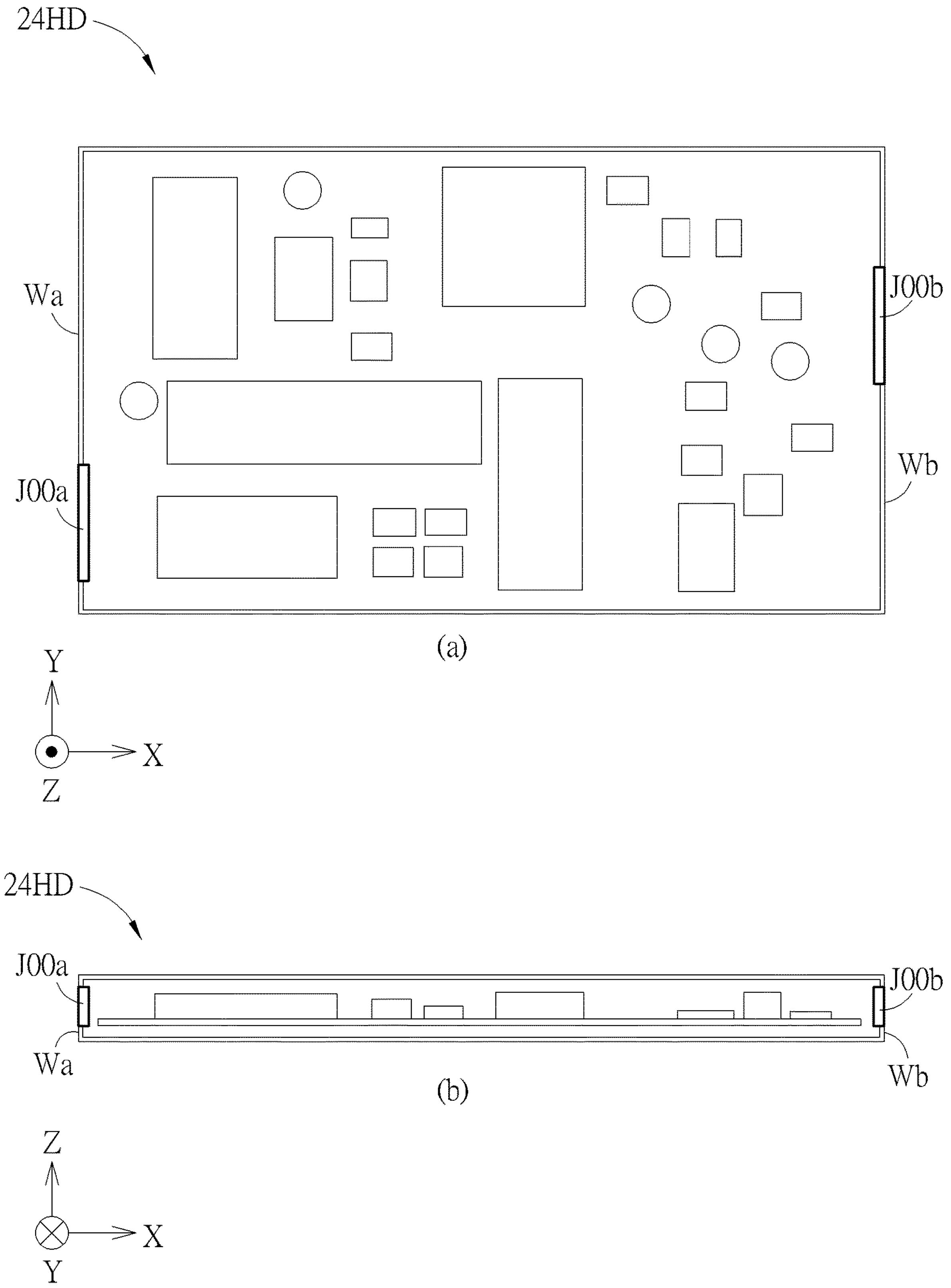
FIG. 24 is a schematic diagram of APG devices of a host device according to an embodiment of the present invention.

A host device may comprise one or more APG devices disposed within the host device. For example, FIG. 24 is a schematic diagram of APG devices J00*a* and J00*b* of a host device 24HD according to an embodiment of the present invention. The two APG devices J00*a* and J00*b* disposed within the host device 24HD are configured to ventilate the space within the host device 24HD. In an embodiment, the host device 24HD may be a host computer where a dimension (e.g., width/length/height) thereof is not limited.

The space inside the host device 24HD may be unorganized/undivided. The host device 24HD may lack a specific pattern designed to guide airflow. However, the placement of the APG devices J00*a* and J00*b* may be essential for adequate cross ventilation.

As shown in FIG. 24 (*a*), the APG devices J00*a* and J00*b* may be disposed diagonally or non-facing/misaligned on/near opposite/nonadjacent faces (e.g., Wa, Wb) of the host device 24HD, but not limited thereto. It is because placing the APG devices J00*a* and J00*b* across from, but not directly opposite, each other may optimize the path air follows through the host device 24HD. Accordingly, airflow may be directed to the place where the cooling air is most needed. Besides, low frequency sound may be blocked without passing through the APG device J00*a* or J00*b*, as back waves of the APG devices J00*a* and J00*b*, which could cancel out their respective front waves thereafter, are less likely to leak out through each other with the help of the facing surfaces/walls (e.g., Wa, Wb) of the host device 24HD.

In an embodiment, the absence of direct mixing between sound pressure from the APG devices J00*a* and J00*b* allows the host device 24HD to employ an adaptive compensation algorithm, which may utilize real-time chamber pressure data to manipulate the operation of the APG devices J00*a* and J00*b*, ensuring optimal performance without introducing unexpected errors by the APG devices J00*a* and J00*b* to the adaptive compensation algorithm.

In an embodiment, the APG devices J00*a* and J00*b* may be substantially parallel. In an embodiment, the faces (e.g., Wa, Wb) where the APG devices J00*a* and J00*b* locate may be farthest apart. In an embodiment, the APG devices J00*a* and J00*b* may be misaligned in the top view (FIG. 24 (*a*)) but aligned in the side view (FIG. 24 (*b*)).

The DC offset of the APG device J00*a* and the DC offset of the APG device J00*b* may have opposite polarities. This polarity contrast is instrumental in creating a push-pull active airflow cooling pathway.

Dust accumulation on the airflow inlet tends to increase over time, which may gradually clog up airflow. In an embodiment, for self-cleaning purposes, the DC offset of the APG device J00*a* may switch/alternate between a first value (e.g., positive or above a threshold) and a second value (e.g., negative or below the threshold) to reverse the air flow regularly/irregularly (e.g., every few minutes), thereby minimizing dust accumulation. Similarly, the DC offset of the APG device J00*b* may switch between a third value (e.g., the second value, a negative value, or below a threshold) and a fourth value (e.g., the first value, a positive value, or above the threshold), which is synchronous with the switching of the APG device J00*a*. As a result, accumulated dusts may be mostly blown off and airflow may be maintained. This self-cleaning mechanism is especially suitable for situations where a high heat generation application requires sustained airflow for extended period of time (e.g., watching action movies or playing dungeon games).

In an embodiment, for self-cleaning purposes, a "puff" operation may be employed occasionally. For example, the APG device J00*a* may pump in air at medium rate (continuously in a first timeslot), and the APG device J00*b* may pump out air at high rate (intermittently (e.g., 2-3 times) in the first timeslot). Then, the roles are reversed: The APG device J00*b* may pump in air at medium rate (continuously in a second timeslot), and the APG device J00*a* may pump out air at high rate (intermittently (e.g., 2-3 times) in the second timeslot). The whole cycle may take about 1 second. Such puffing operation may be activated as frequent as every time the host device's power button is pushed and disguised by playing a motorcycle starting sound (e.g., "pon", "pon", "pon", "pon"). As a result, accumulated dusts may mostly be dislodged and airflow may be maintained.

An APG device may be disposed within a wearable sound device (e.g., an in-ear sound device, an earbud, a headphone or a hearing-aid) to ventilate an ear canal. Ear canal ventilation/drying may prevent infection caused by bacteria, fungi growth due to long-term use.

Figure 25:
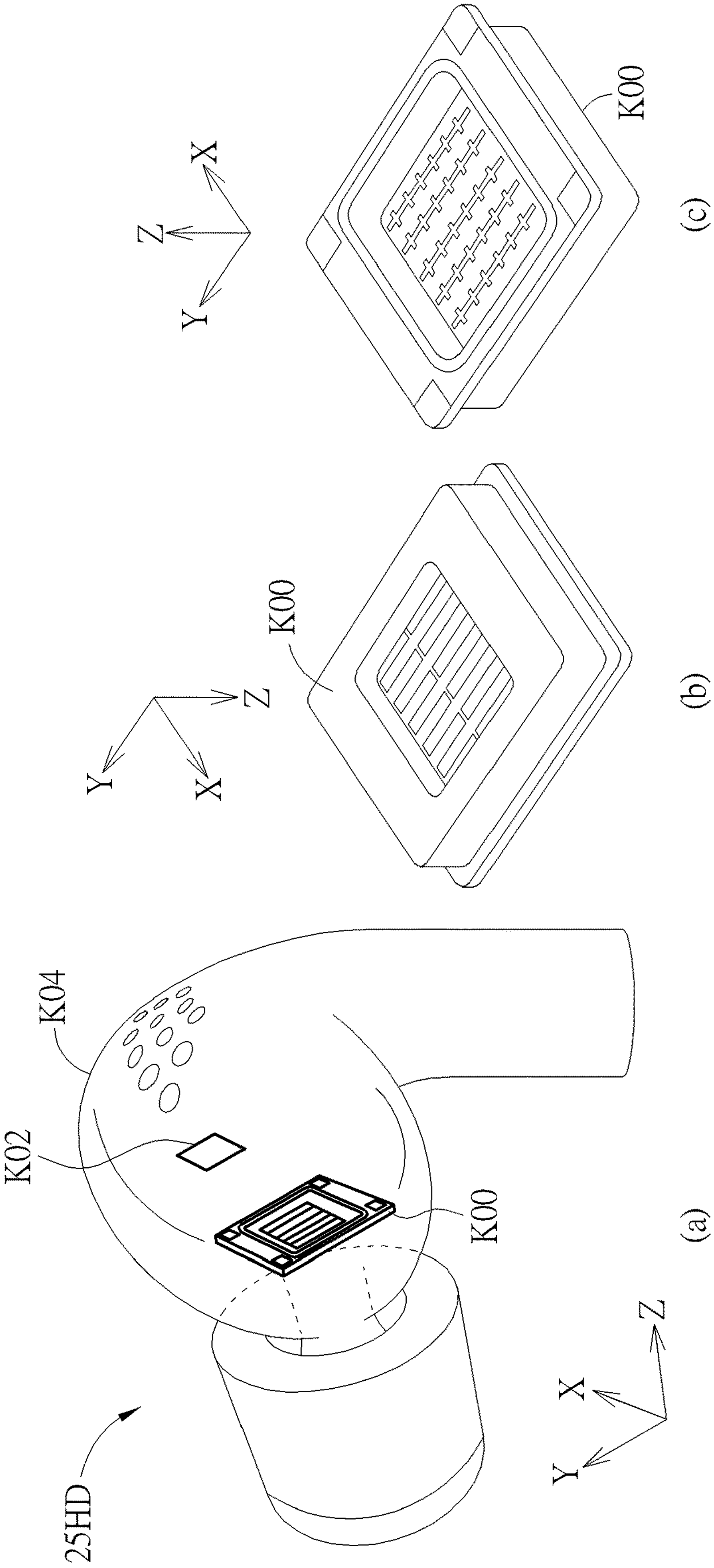
FIG. 25 is a schematic diagram of an APG device of a host device according to an embodiment of the present invention.

For example, FIG. 25 is a schematic diagram of an airflow generating device K00 of a host device 25HD according to an embodiment of the present invention. The host device 25HD may be a wearable sound device such as earbud or hearing-aid. The wearable sound device 25HD comprises the airflow generating device K00. The airflow generating device K00 is configured to provide constant airflow or (net) air movement, toward or outward ear canal when user wears it, in order to achieve canal drying/dehumidifying/ventilation. FIG. 25 (*a*) illustrates the host device 25HD; FIG. 25 (*b*) and (*c*) provide views of the front side and the back side of the airflow generating device (or APG device) K00, respectively.

The airflow generating device (or APG device) K00 within the host device 25HD (i.e., a wearable sound device) may produce constant airflow within, into, or out of the host device 25HD, facilitating ear canal cooling or drying, which can prevent infection caused by bacteria, fungi growth due to extended use.

In addition, the host device 25HD may comprise suitable vent(s) (e.g., on its housing K04) to allow releasing pressure due to low-volume airflow, which may constantly refresh air within the host device 25HD or the ear canal and lead to a more comfortable long-time wearing experience. In an embodiment, the vent(s) may be designed to remain permanently open, but not limited thereto. In addition, dimension, shape(s) or position(s) of the housing K04 is not limited, which can be designed according to practical requirements.

Note that, the airflow generating device (e.g., K00) disposed within the wearable sound device is not limited to be APG device. Any device capable of producing constant air flow and disposed within the wearable sound device should satisfy the requirements of present invention, which is within the scope of the present invention.

The strength/volume of a net airflow may be controlled/adjusted dynamically, programmatically, automatically, responsive to output(s) of a sensor (e.g., a humidity sensor or a thermometer) disposed within the host device 25HD, or manually by a user.

In other words, the host device 25HD or the wearable sound device 25HD may comprise a sensor (e.g., K02 in FIG. 25), and volume of airflow produced by the airflow generating device (or APG device) K00 may be adjusted according to a sensing result of the sensor (K02). In an embodiment, the sensor K02 may be a humidity/temperature sensor, and volume of airflow produced by the airflow generating device (or APG device) K00 may be adjusted according to sensing result of the sensor K02, which is not limited thereto. Note that, position of sensor K02 within the host device 25HD may be optimized according to practical requirements, which is not limited thereto.

A user may change/adjust the strength/volume of a net airflow by controlling the wearable sound device manually; alternatively, the airflow generating device K00 may be triggered/activated according to an instruction signal from a sensor, which is disposed within the host device 25HD or communicatively coupled to the airflow generating device K00 via a wireless/wired connection. The strength/volume of a net airflow may be adjusted via the amplitude of a demodulating (driving) signal (e.g., ±SV) and/or a modulating (driving) signal (e.g., SM).

The APG device (e.g., K00) generating constant amplitude air pulses is designed to have low power consumption, by taking advantage of the energy recycling set forth above.

In a word, in applications where audio is unnecessary, the host device 25HD (operated in the blower mode) may or may not be powered by a battery, and the air pulses (AP) may still produce a net air movement constantly toward one direction to dry the ear canal (or dissipate heat previously generated by the host device 25HD). Unlike traditional speaker technologies such as electrodynamic or electrostatic, which lack the ability to move air in one (single) direction, the APG device or airflow generating device (e.g., K00), of present invention, capable of unidirectional airflow offers a solution for ventilation.

Details or modifications of a wearable sound device, a sound producing device, a APG device, and a circuit for energy recycling are disclosed in U.S. Application Nos. 62/572,405, 62/575,672, 62/579,088, 62/579,914, and 63/437,371, the disclosure of which is hereby incorporated by reference herein in its entirety and made a part of this specification.

In summary, the air-pulse generating device of the present invention generates asymmetric air pulses at ultrasonic pulse rate and can functions as air pump. The plurality of air pulses produce net airflow constantly toward one single direction, which may be applied to air movement applications such as cooling, drying, dehumidifying, heat dissipation and/or ventilation applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An air-pulse generating device, comprising:

a film structure, comprising a flap pair, configured to be actuated to generate a plurality of air pulses at an ultrasonic pulse rate;

wherein the flap pair comprises a first flap and a second flap opposite to each other;

wherein the flap pair is configured to perform a differential-mode movement and to form a virtual valve or an opening at an opening rate which is synchronous with the ultrasonic pulse rate;

wherein the plurality of air pulses produce a net airflow constantly toward one single direction;

wherein the virtual valve is closed within a period corresponding to a first transition time of the first flap and a second transition time of the second flap.

2. The air-pulse generating device of claim 1, wherein the film structure is actuated by a driving signal;

wherein the driving signal is generated according to an input signal comprising a nonzero DC (direct current) offset.

3. The air-pulse generating device of claim 2, wherein wherein the plurality of air pulses produce a first net airflow toward a first direction in response to the DC offset being positive;

wherein the plurality of air pulses produce a second net airflow toward a second direction in response to the DC offset being negative;

wherein the first and second directions are opposite to each other.

4. The air-pulse generating device of claim 1, wherein the film structure is actuated by a modulation signal to perform a common-mode movement;

wherein the modulation signal is generated according to an input signal comprising a nonzero DC offset.

5. The air-pulse generating device of claim 1, wherein the film structure is actuated by a demodulation signal to perform the differential-mode movement.

6. The air-pulse generating device of claim 1, wherein a direction of the net airflow produced by the AP device is determined by a phase between a modulation signal and a demodulation signal.

7. The air-pulse generating device of claim 1, wherein the air-pulse generating device functions as an air pump.

8. The air-pulse generating device of claim 1, wherein the air-pulse generating device is disposed on, under or by a heat source and configured to dissipate heat from the heat source.

9. The air-pulse generating device of claim 1, wherein the air-pulse generating device is configured for ventilation.

10. The air-pulse generating device of claim 1, wherein the air-pulse generating device is disposed within a wearable sound device and configured to ventilate an ear canal.

11. The air-pulse generating device of claim 1, wherein the air-pulse generating device is disposed within a host device and configured to ventilate a space within the host device.

12. A method of heat dissipation, comprising:

disposing the air-pulse generating device of claim 1 on, under, or by a heat source.

13. A method of ventilation, comprising:

disposing the air-pulse generating device of claim 1 within a host device.

14. A method of ear canal ventilation, comprising:

disposing the air-pulse generating device of claim 1 within a wearable sound device.

15. A method of sensing air quality, comprising:

disposing the air-pulse generating device of claim 1 within an air quality sensing device.

16. A wearable sound device, comprising:

a housing; and an airflow generating device, configured to produce an airflow constantly toward one single direction;

wherein the airflow generating device comprises a flap pair;

wherein the flap pair comprises a first flap and a second flap opposite to each other;

wherein the flap pair is configured to perform a differential-mode movement and to form a virtual valve or an opening;

wherein the virtual valve is closed within a period corresponding to a first transition time of the first flap and a second transition time of the second flap.

17. The wearable sound device of claim 16, wherein the airflow generating device produce the airflow toward or outward an ear canal when a user wears the wearable sound device.

18. The wearable sound device of claim 16, wherein the airflow generating device comprises a film structure;

wherein the film structure is actuated by a driving signal;

wherein the driving signal is generated according to an input signal comprising a nonzero DC (direct current) offset.

19. The wearable sound device of claim 16, further comprises:

a sensor;

wherein volume of airflow produced by the airflow generating device is adjusted according to a sensing result of the sensor.

20. A bladeless fan, comprising:

a film structure, comprising a flap pair;

wherein the bladeless fan produces a plurality of air pulses according to air pressure variation, and the plurality of air pulses are asymmetric;

wherein the plurality of air pulses produced by the bladeless fan constitute net air movement or net airflow constantly toward one direction;

wherein the flap pair comprises a first flap and a second flap opposite to each other;

wherein the flap pair is configured to perform a differential-mode movement and to form a virtual valve or an opening;

wherein the virtual valve is closed within a period corresponding to a first transition time of the first flap and a second transition time of the second flap.

21. The bladeless fan of claim 20, wherein the bladeless fan is disposed within a host device comprising a vent.

22. The bladeless fan of claim 20, wherein the bladeless fan produces audio sound and airflow toward one direction at the same time.

23. The bladeless fan of claim 20, wherein the plurality of air pulses is generated according to an input audio signal;

wherein the input audio signal comprises a nonzero direct current (DC) offset.

24. The bladeless fan of claim 20, wherein volume of airflow produced by the bladeless fan is controlled in response to an output of a humidity sensor.

25. The bladeless fan of claim 20, wherein the first flap is driven by a demodulation-driving signal or a modulation-driving signal;

wherein volume of airflow produced by the bladeless fan is adjusted via an amplitude of the demodulation-driving signal or the modulation-driving signal.

26. A method of producing airflow, comprising:

producing a plurality of air pulses, by a film structure of an air-pulse generating device, at an ultrasonic pulse rate;

wherein the plurality of air pulses produces a net airflow constantly toward a single direction;

wherein the film structure comprises flap pair;

wherein the flap pair comprises a first flap and a second flap opposite to each other;

wherein the step of producing the plurality of air pulses comprises driving the flap pair to perform a differential mode movement so as to form a virtual valve or an opening at an opening rate which is synchronous with the ultrasonic pulse rate;

wherein the virtual valve is closed within a period corresponding to a first transition time of the first flap and a second transition time of the second flap.

27. The method of claim 26, comprising:

driving the film structure of the air-pulse generating device via a driving signal;

wherein the driving signal is generated according to an input signal, and the input signal comprises a nonzero direct current (DC) offset.

28. The method of claim 26, comprising:

driving the film structure of the air-pulse generating device via a modulation-driving signal, to perform a common-mode movement;

wherein the modulation-driving signal is generated according to an input signal, and the input signal comprises a nonzero direct current (DC) offset.

29. The method of claim 26, comprising:

driving the film structure of the air-pulse generating device via a demodulation-driving signal, to perform the differential-mode movement.

* * * * *